United States Patent [19]
Clare et al.

[11] Patent Number: 6,036,258
[45] Date of Patent: Mar. 14, 2000

[54] COLLAPSIBLE SUPPORT SYSTEM FOR A VEHICLE BED

[76] Inventors: Scott Clare, 3381 Shawn Ct.; Neil G. Long, 2630 Randall Way, both of Hayward, Calif. 94541

[21] Appl. No.: 09/333,147

[22] Filed: Jun. 14, 1999

Related U.S. Application Data

[60] Division of application No. 08/896,392, Jul. 18, 1997, and a continuation-in-part of application No. 08/685,678, Jul. 24, 1996, abandoned, which is a continuation-in-part of application No. 08/506,893, Jul. 26, 1995, Pat. No. 5,567,000.

[51] Int. Cl.⁷ ........................................................ B60J 7/00
[52] U.S. Cl. ........................................... 296/189; 296/183
[58] Field of Search ................................. 296/24.1, 183, 296/189

[56] References Cited

U.S. PATENT DOCUMENTS 3,806,184  4/1974  Dean .................................... 296/189 X

FOREIGN PATENT DOCUMENTS 4-221279  8/1992  Japan ...................................... 296/189

Primary Examiner—D. Glenn Dayoan
Assistant Examiner—Lori L. Coletta
Attorney, Agent, or Firm—L. E. Carnahan

[57] ABSTRACT

A hidden storage system is incorporated in the bed of a vehicle without altering the bed's external appearance. The storage system is located adjacent the wheel well sections of the bed, and uses hinges to open and close the fender/side panel of the bed. Since the storage system does not alter the truck's external appearance, it reduces the attraction for theft. Also, since the storage area does not extend inwardly beyond the conventional wheel wells, the storage system leaves most of the truck bed free for use. The hidden storage system is incorporated into the bed by either an initial fabrication method or a conversion method using an existing bed. Collapsible support beams are located under the bed and upon impact the beams collapse rather than bending, thereby preventing rupture of a fuel tank typically located beneath the bed.

16 Claims, 15 Drawing Sheets

COLLAPSIBLE SUPPORT SYSTEM FOR A VEHICLE BED

RELATED APPLICATION

This application is a division of U.S. application Ser. No. 08/896,392 filed Jul. 18, 1997 which now abandoned is a Continuation-In-Part of U.S. application Ser. No. 08/685,678 filed Jul. 24, 1996, now abandoned which is a Continuation-In-Part of U.S. application Ser. No. 08/506,893 filed Jul. 26, 1995, now U.S. Pat. No. 5,567,000 issued Oct. 22, 1996.

BACKGROUND OF THE INVENTION

The present invention relates to vehicles, such as pickup trucks, particularly to hidden storage/utility beds for compact-size, mid-size and full-size pickup trucks, trailers, and full-size trucks having side panels, and more particularly to improvements in hidden storage vehicle beds and to conversion or assembly methods for providing a hidden storage bed on a conventional pickup, for example, without altering the external appearance of the bed.

Pickup trucks have long been a means for transporting and/or storing tools, materials, etc. for various trades, such as plumbing, electrical, construction, repair, etc. While conventional tool boxes, which generally extend across the pickup bed, are a convenient tool storage approach, such take up a great deal of space and thus reduce the carrying capacity. Also, the conventional pickup beds have been removed and replaced with utility type beds of various types, such as exemplified by U.S. Pat. No. 5,267,773 issued Dec. 7, 1993 to G. Kalis, Jr. et al. In addition, the pick-up truck body and/or beds have been modified to provide storage/utility space, such as exemplified by U.S. Pat. No. 4,917,430 issued Apr. 17, 1990 to M. A. Lawrence.

While these prior storage/utility arrangements have been satisfactory for their intended purpose, such are an attraction for theft as well as having an appearance of a utility bed. Thus, there has been a need for a storage/utility system for pickup truck beds which does not alter the bed's external appearance or significantly reduce the interior size of the bed, thereby reducing the tool theft problem while providing space for hidden storage without significant reduction of the bed's carrying capacity.

This need has been filled by the invention described and claimed in above-referenced U.S. Pat. No. 5,567,000 which involves the conversion or assembly of a conventional pickup truck bed into a hidden storage/utility bed without altering the external appearance of the bed and without significant reduction in the carrying capacity thereof. A truck with a trunk. This is accomplished by providing storage adjacent the wheel well area, and along the length of the bed, and providing the fender/side panel of the bed with a hinge and latch arrangement whereby the fender/side panel can be raised to expose the storage area, or closed and latched to conceal the storage area. Thus, the pickup can be used for pleasure or work without the appearance of its storage/utility capability, and can be parked in areas where theft would likely occur from conventional tool boxes or utility beds. Improvements have been made to the hidden storage/utility bed of the above-referenced patent which includes different fender/side panel hinging, lock and latch systems, collapsible support beams, struts for the fender/side panels, and shelving arrangements including slideable shelves.

SUMMARY OF THE INVENTION

It is an object of the present invention to provide a hidden storage system for a vehicle bed, such as a conventional pickup truck bed, without substantially altering the external appearance of the bed.

A further object of the invention is to provide a method for converting a standard pickup truck bed into a hidden storage bed.

A further object of the invention is to provide a method for fabricating a bed with a hidden storage system therein.

A further object of the invention is to provide a pickup truck bed, for example, with storage capability without a significant reduction in the carrying capacity thereof.

Another object of the invention is to provide a vehicle bed with hidden storage capability without significantly altering the external appearance of the bed, and wherein sections of entire side panels of the bed are hinged to enable the side panel or sections thereof to be raised or lowered to expose storage shelves which may be fixed, slideable or adjustable.

Another object of the invention is to provide a vehicle bed with a hidden storage system wherein sections or the entire fender/side panel of the bed is hinged to allow access to the storage area, and the panel or sections are provided with struts and locking and latching means.

Another object of the invention is to reduce theft potential from a storage bed of pickup trucks, etc. and improve the safety of such vehicles when the bed is impacted from the side, by providing collapsible support beams for the hidden storage bed.

Another object of the invention is to provide a standard bed, such as pickup trucks of various sizes, trailers or full-size trucks having fender/side panels with a hidden storage system by converting an existing bed or by incorporation of the system during fabrication of the bed, and wherein the storage system can be provided with a variety of shelving arrangements such that the shelving can be used for storage of small items such as tools or parts, or large items such as skis, or golf clubs, etc.

Other objects and advantages of the invention will become apparent from the following description and accompanying drawings. The invention involves a hidden storage system for beds, such as pickup truck beds, that can be installed in any fleetside or stepside bed without altering the bed's appearance. A vehicle having side panels can be fabricated or modified to include the storage system. The storage system is installed in the wheel well area of the bed, and uses hinges to open and close sections or the entire fender/side panel of the bed, either upward or downward. The fender/side panel is provided with a latching and lock mechanism, which may be electrically or mechanically activated. Since the storage system only involves the area of bed adjacent the wheel wells, it does not significantly reduce the carrying capacity of the bed. By providing a hidden storage system for a pickup truck bed, for example, the potential of theft therefrom is substantially reduced since the unaltered appearance of the bed's external surfaces would not lead one to a realization that it contained tools, etc. The hidden storage system thus provides a truck with a trunk. The hidden storage system can be initially fabricated in the bed, such as on an assembly line using either individual components or modular components, or existing beds can be converted to include the system. The hidden storage system includes struts to hold the side panel up and collapsible support beams to improve safety from fuel tank rupture due to a side impact.

BRIEF DESCRIPTION OF THE DRAWINGS

The accompanying drawings, which are incorporated into and form a part of the disclosure, illustrate an embodiment of the hidden storage system and fabrication methods for producing the system and, together with the description, serve to explain the principles of the invention.

DETAILED DESCRIPTION OF THE INVENTION

The present invention involves improvement of and the fabrication of a hidden storage system for a pickup truck bed, for example, such as described and claimed in above-referenced U.S. Pat. No. 5,567,000, and involves a method for fabricating a bed to include the hidden system or for conversion of a conventional pickup truck bed to a hidden storage bed without altering the external appearance of the bed, and without a significant reduction in the carrying capacity of the bed. While the invention is illustrated and described for fleetside and stepside versions of a pickup bed, it can be installed, either by initial assembly or conversion in any type of bed having available space, and utilizing fender/side panels. The present invention reduces the theft potential from storage beds by eliminating the appearance of such beds. The invention utilizes lost space adjacent the wheel wells of the bed while maintaining the space between the wheel wells. As known, the space between the wheel wells of a conventional pickup truck bed, for example, is about four (4) feet and the conventional pickup truck beds have a length of about eight (8) feet, wherein sheets of 8 ft. by 4 ft. material, such as plywood, etc. can be carried between the wheel wells. However, the space in front and back of the wheel wells is generally considered lost space for large items until material has been stacked above the height of the wheel wells. Thus, by utilizing the area in front, back, and above the wheel wells as hidden storage space, the overall storage/carrying capacity of the bed is increased between the outer fender and inner fender of a stock pickup by removing the inner fender. Here, the term storage space is defined as that space in which tools, such as vices, saws, parts, skis, golf clubs, etc. can be stored or mounted for use, and in which shelves can be secured or movably mounted for retaining such tools, parts, skis, etc. While the description is directed to a compact, mid-size or full-size pickup bed, the system of the invention can be incorporated into trailers and full-size trucks which utilize fender/side panels.

Figure 1:
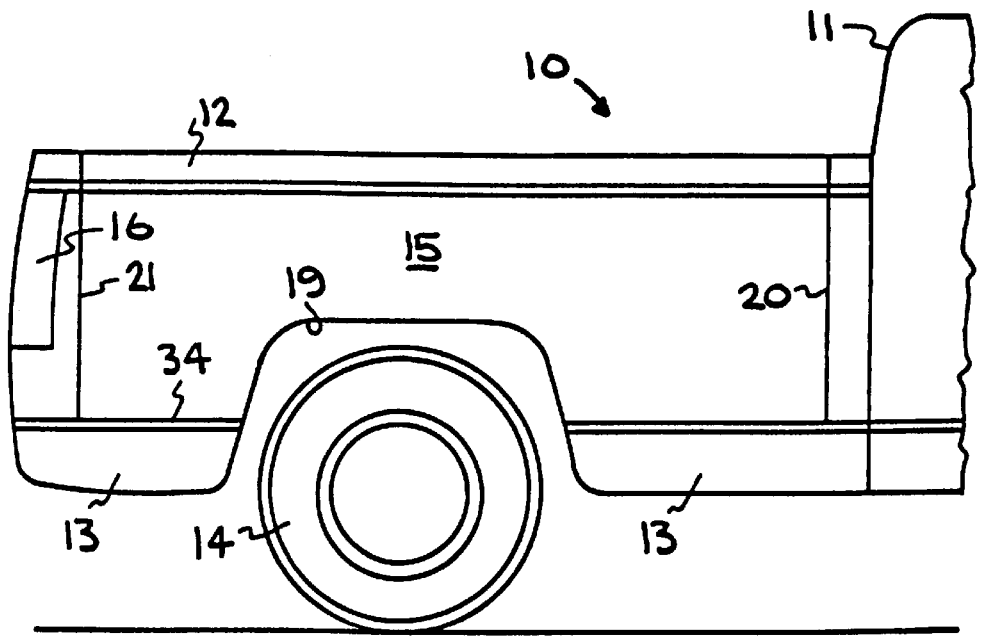
FIG. 1 is a view of a side of a pickup truck bed which has been modified to incorporate the storage system under the closed fender/side panel of the bed in accordance with the present invention.

By the present invention, a conventional pickup truck bed is initially fabricated or converted to a hidden storage bed, whereas the conventional installation of storage/utility beds involve the replacement of the conventional bed, thus the cost of conversion compared to the cost of the conventional bed replacement is substantially less. Basically, the conversion involves cutting each fender/side panel (hereinafter called side panel) vertically in two places and along the upper length thereof, on an inner surface of the side panel, as described in detail hereinafter, disconnecting the lower length of the side panels from the bed frame, hinging the side panel along the upper length, providing braces on the side panels, installing a latching mechanism along the lower length of the side panels, providing a key lock for the latching mechanism, installing a storage structure or box over the wheel wells along each side of the bed, securing shelving to the storage box, and painting the cut areas and the storage box to correspond to the color of the bed. Upon completion of the conversion, from a side view, the only difference between the converted bed and a non-converted bed are two vertical lines or small spaces, one just back of the front of the bed and one just forward of the tail light section of the bed, where the side panel is cut, as illustrated in FIG. 1. The hinge for each side panel is located on an inner area of the side panel so as not to be exposed to one viewing the bed from an external side position. Thus, one would not readily recognize the modification to the bed, and therefore those with intent to steal tools, etc. would not recognize the hidden storage arrangement.

The hidden storage system can be initially fabricated into the bed, as in an assembly line arrangement, wherein the various parts are initially fabricated, then assembled and painted as the bed passes from station to station along an assembly line, as described in greater detail hereinafter. Also, the system can be fabricated/assembled utilizing a modular fabrication/assembly method as described and claimed in copending U.S. application Ser. No. 08/896,388, filed Jul. 18, 1997, entitled Hidden Storage/Utility System Modular Fabrication Method.

Figure 2:
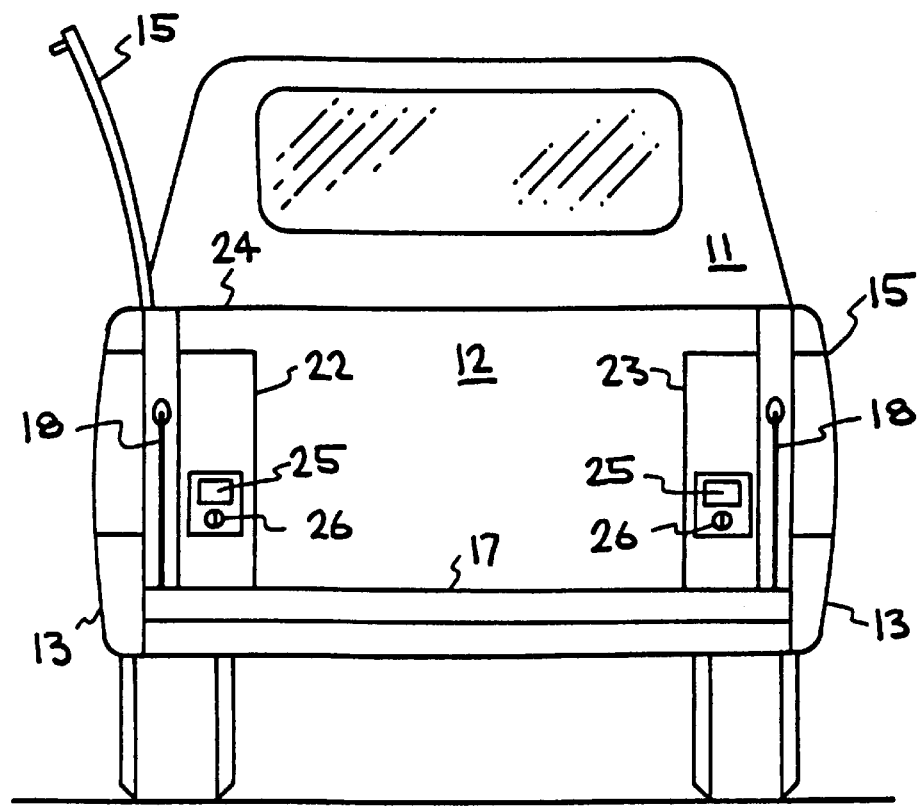
FIG. 2 is an end view of the pickup truck bed of FIG. 1 showing the left fender/side panel open, the right fender/side panel closed, the tail gate open, and the storage boxes and lock mechanism within the bed.

Referring now to the drawings, FIGS. 1 and 2 illustrate a conventionally appearing pickup truck generally indicated at 10 having a cab 11, bed 12, frame or undercarriage 13, and wheels 14. The bed 12 is mounted on frame or undercarriage 13 and includes side panels 15, a tail light arrangement 16, a hinged tail gate 17 with stop mechanisms 18, and wheel wells 19. However, the bed 12 of FIGS. 1 and 2 has been modified in accordance with the present invention, with the only indication of such modification being the cuts, small spaces, or lines 20 and 21 in the side panels 15, as shown in FIG. 1, with the side panel being closed. Note that in this embodiment the side panels 15 terminate adjacent the frame or undercarriage 13.

Figure 3:
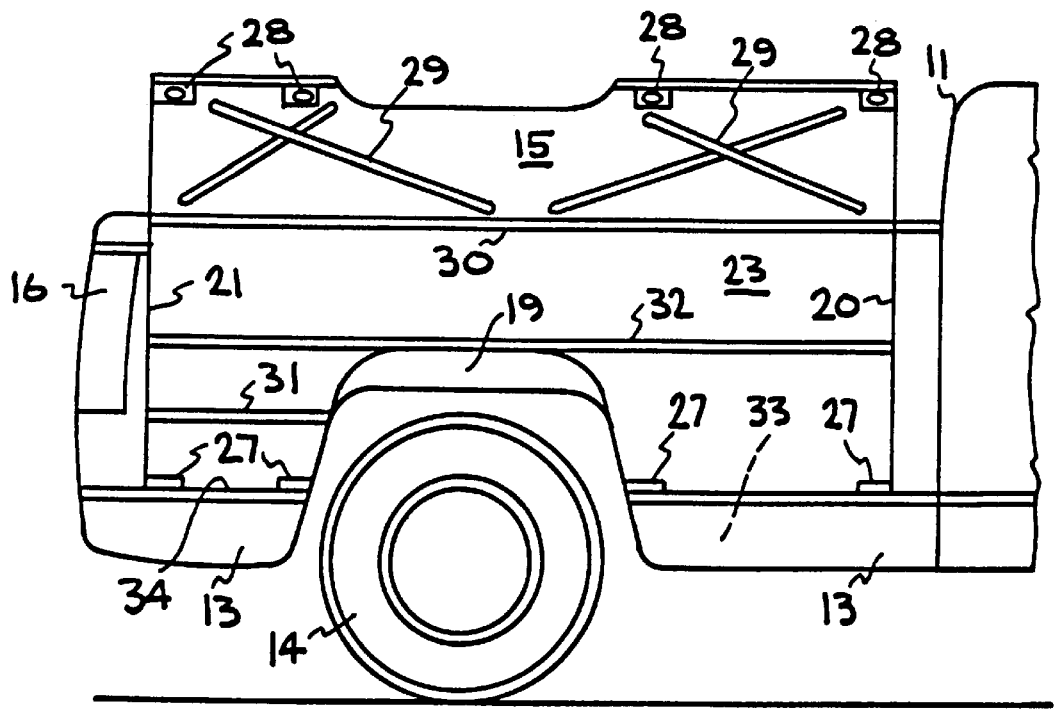
FIG. 3 is a view of an embodiment of the storage system of the FIG. 1 pickup truck bed with the fender/side panel raised to illustrate the storage bin shelves and latch mechanism.
Figure 4:
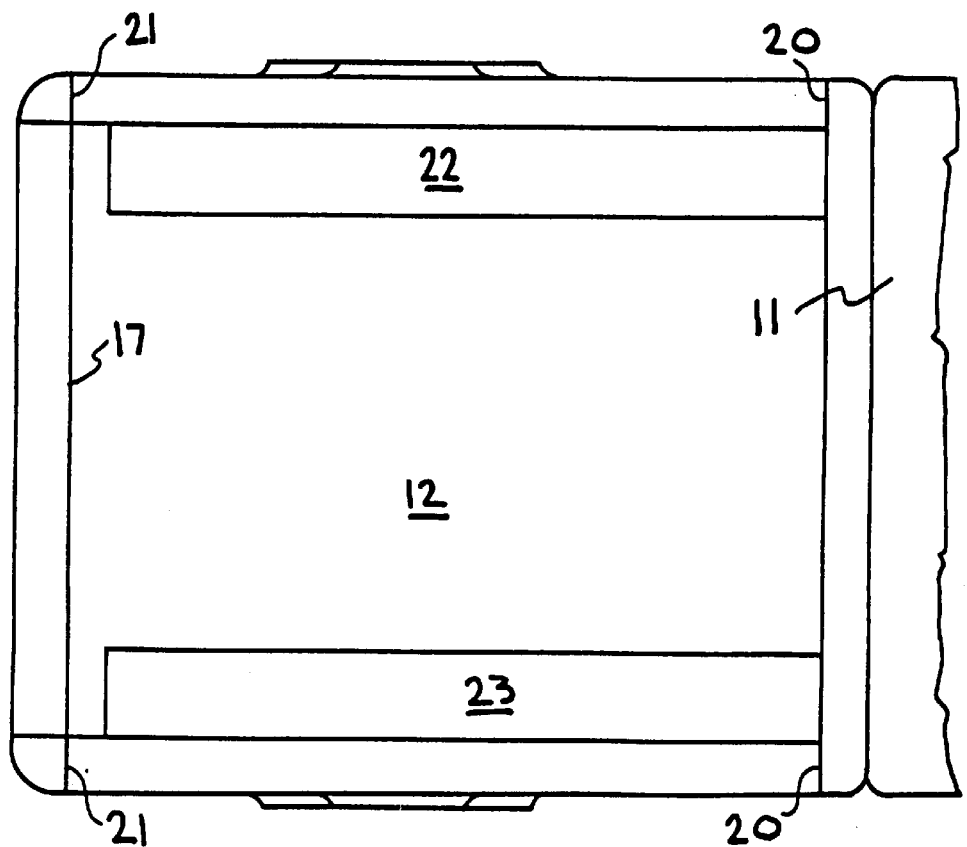
FIG. 4 is a top view of the FIG. 1 pickup truck bed illustrating the storage boxes and fender/side panels, with the tail gate closed.

As seen in FIGS. 2, 3 and 4, the hidden storage/utility area is provided by storage or structure boxes 22 and 23 mounted within the bed 12 and over the wheel wells 19, the boxes 22 and 23 being constructed to cover the wheel wells 19, but not extend to the top or upper surface 24 of bed 12, and terminate in spaced relation to tail gate 17. A latch mechanism 25 is mounted in the rear of each of boxes 22 and 23, as seen in FIG. 2, and is provided with a key lock 26. The latch mechanism 25 includes latch members 27 located in spaced relation along the bed 12, and which cooperate with corresponding latch members 28 in side panel 15, as shown in FIG. 3. While not shown, the latch members 27 are interconnected by a rod or cable which is connected to mechanism 25 which includes a release for members 27.

As seen in FIG. 3, the side panels 15 are each provided with braces 29 and a hinge 30 that extends the full length thereof. Shelves 31 and 32 and 32 are secured to the interior of storage or structure boxes 22 and 23, and the area forward of the wheel well 19 forms a storage bin 33. The hinges 30 are located on the interior of the bed 12 and thus not visible from the exterior.

In another embodiment of the hidden storage system, the cut lines and 21 of FIG. 1 were eliminated, and the hinged side panel 15 extends from the forward end of the bed 10 to the tail light arrangement 16, and the only visible cut or line extends downwardly from the tail light arrangement 16 to the lower edge of the hinged side panel.

To illustrate the effectiveness of the hidden storage system, a pickup bed was modified to incorporate the hidden storage on only one side using the above-described modification of FIG. 1 wherein the hinged side panel extended from the front end or edge of the bed to the tail light assembly, with the only exposed line or cut being the short cut below the tail light assembly. Thousands of people who viewed the modified pickup from both sides of the bed were unable to determine which side incorporated the hidden storage system. Since the storage box, such as box 22 of FIG. 1, terminated below the upper edge of the pickup side panel, it could not be seen from an external side viewing of the bed. This clearly verified the potential the hidden storage system has to eliminate or substantially reduce loss by theft. Further, the pickup containing the hidden storage system of FIG. 1 was parked in a high crime area (where conventional utility beds such as the above-referenced Kalis, Jr. et al utility bed were continuously broken into) to determine if theft attempts would be carried out. None were, obviously because those having the intent of theft were unable to recognize that the pickup contained a storage area.

Figure 5:
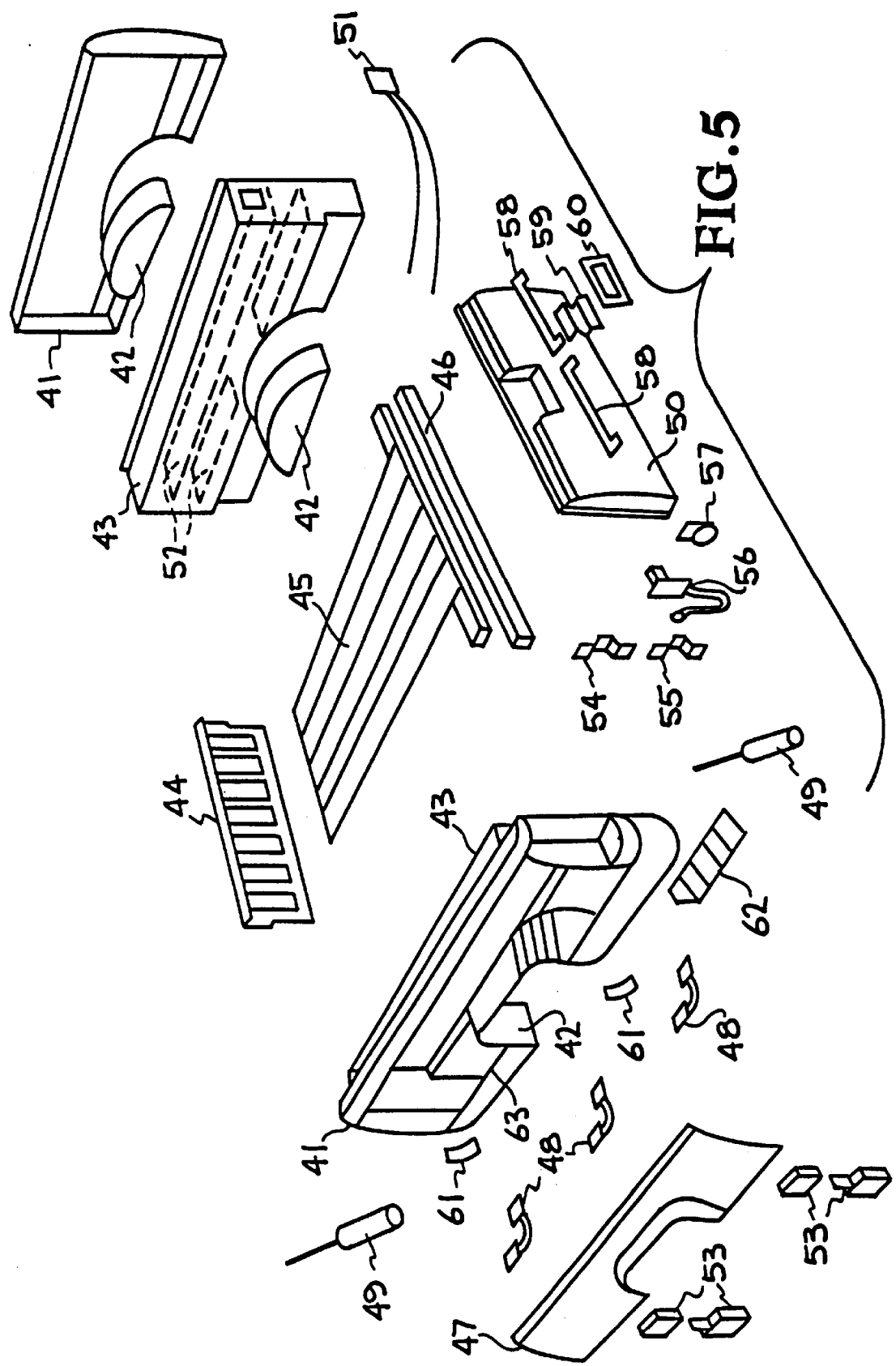
FIG. 5 is an exploded view of a fleetside or styleside light duty pickup bed incorporating the hidden storage system.

FIG. 5 illustrates in exploded view an embodiment of a fleetside or styleside version of a light duty pickup truck bed incorporating the hidden storage system, and which can be initially fabricated as a unit, or which can be formed by conversion of an existing bed. The initial fabrication process or method and the conversion process or method are described in detail hereinafter.

As shown in FIG. 5, the hidden storage system comprises side panel assemblies 41 for either a short or long bed, wheelhouse panels 42, storage housing assemblies 43 for either a short or long bed, a front panel 44, a floor panel 45 for either a short or long bed, a floor sill 46, a door panel assembly 47, door panel hinges 48, panel door gas charged shock absorbers 49, a tailgate assembly 50, a storage box, lock and latch assembly 51, storage shelving assemblies 52, door panel lock and latch assemblies 53, tailgate striker 54, tailgate outer hinge 55, tailgate latch and cable assembly 56, tailgate inner hinge 57, tailgate latch rods 58, tailgate handle 59, tailgate bezel handle 60, a wheel opening 61, a side panel shield 62, and a panel door gasket 63. While only one part or component is shown for simplicity in certain instances it has a corresponding component on an opposite side not shown.

Figure 6:
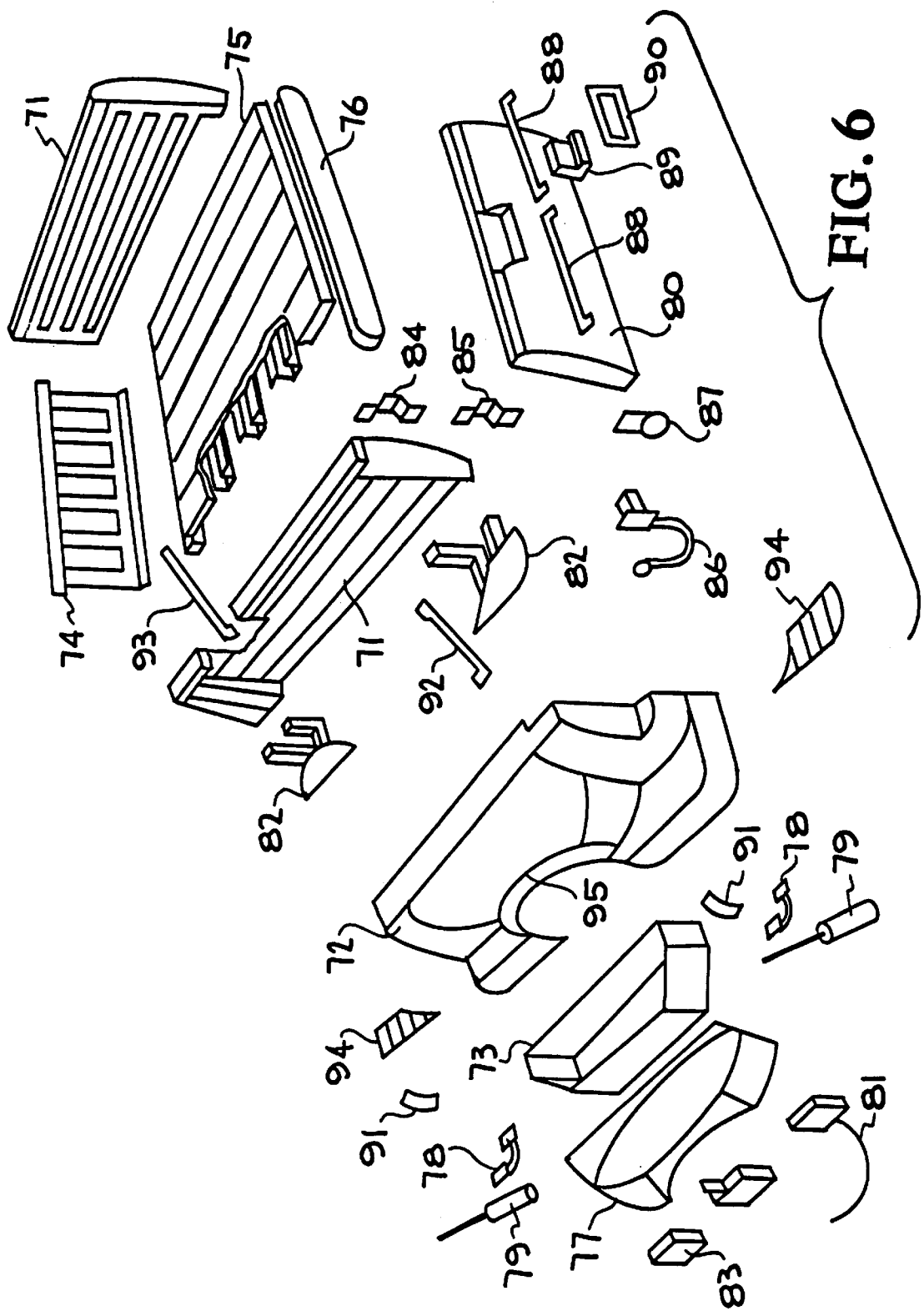
FIG. 6 is an exploded view of a stepside light duty pickup bed incorporating the hidden storage system.

As shown in FIG. 6, the hidden storage system can be incorporated into a stepside version of a light duty pickup truck bed, and comprises side panels 71 for long or short beds, fenders 72, only one shown, panel storage box assembly 73, front panel 74, floor panel 75 for long or short beds, a floor sill 76, door panel assembly 77, hidden door hinges 78, gas charged shock absorbers 79, tailgate assembly 80, latch lock and cable assembly 81, fender brackets 82, door panel lock and latch assemblies 83, tailgate striker 84, tailgate outer hinge 85, tailgate latch and cable assembly 86, inner hinge 87, latch rods 88, tailgate handle 89, bezel handle 90, wheel openings 91, fender rear brace 92, fender front brace 93, front and rear step pads 94, and door panel assembly gasket 95. While certain parts are shown singly for simplicity, corresponding parts not shown are utilized on the opposite side of the bed.

The invention involves a method for carrying out initial fabrication of a bed, for pickup trucks for example, which incorporates the hidden storage system, as well as a method for carrying out the conversion of an existing conventional pickup bed, for example, to incorporate the hidden storage system. In either case, the hidden storage system is incorporated with substantially no change in the appearance of the external fender/side panel of the bed.

The conversion method can be utilized to enable damaged beds or existing undamaged beds to be modified to include the hidden storage system. In the case of damaged beds, new fender/side panels and hidden storage assembly components are prefabricated in a jig system platform assembly similar to the initial fabrication method described hereinafter, but without the bed panel, front panel and tailgate assemblies, as illustrated in either of FIGS. 5 or 6. These prefabricated hidden storage system components are available for four to eight foot and longer pickup truck bed lengths, as manufactured for any light duty truck. In addition, the system components can be manufactured to be incorporated into trailers and full-size trucks having fenders and/or side panels.

Conversion of Existing Bed

1. Remove the spare tire from under the bed for safety. Disconnect the fuel tank filler from the exterior side panel skin. CAUTION! Do not utilize a cutting torch or grinder or cutter where sparks fly that may ignite fuel in, around or near fuel tanks. Secure fuel tanks to avoid ignition PRIOR to beginning cutting.

2. Proceed to unbolt the existing bed from the chassis end disconnect wiring harness plugs. Remove the taillight assemblies. SEE CAUTION ABOVE: Cut the right and left side panels along the longitudinal axis of the bed panel and to the prescribed limit at the rear of the bed panel. Cut the front panel/side panel vertical joint loose. Preserve the last six inches of the bed panel adjacent to the tailgate bulkhead. This portion of the bed panel is utilized in the final bed construction.

3. Establish a level work station for the salvaged bed panel, front panel, tailgate and bulkhead assembly panels. The bed should be leveled along all axis. Plumb the front panel and tailgate bulkhead assembly. Secure jig the parts to the work station with cross rods and supports to prevent dislocation during retrofitting assembly.

4. Install the new side panel and storage panel assembly with wheelhouse to the bed panel and front and tailgate bulkhead. Check level and plumb positioning. Clamp the components securely into position. Install weld positioning clips and tack weld the hidden storage system into position. (Do not begin a full weld-up at this time.)

5. Perform the identical installation on the opposite side of the bed. Check all tack welds. Check level and plumb and inside bed clearances and tolerances for both hidden storage system panels.

6. Install the hidden storage door panels to the hinge mounts (if the doors have been removed after shipment) and check form and fit. Do not force the door if an adjustment is required. Verify hinge adjustment position and door margin without gaskets. Special partial gaskets are provided to install in the annular space at pre-marked locations around the door to simulate margin fit without full gasket installation.

7. When all margins are verified, stitch weld the new hidden storage panel assembly to the bed panel along the provided weld clips. Following clip stitch welding, re-check bed tolerances, level and plumb. Complete the weld-up, watching for heat distortion in bed components. Maintaining quality assurance conditions throughout the bed conversion reconstruction will ensure a precise and quality end product.

8. Remove light weld slag and wheel grind any unsightly weld, as required. Check form, fit and finish.

9. Prep the salvaged portion of the truck bed with standard Standing Painting Council methods for the auto industry, touch prime cleaned and sanded areas. Proceed to remove any rust or loose paint from the bed. Avoid moisture.

10. Lift the bed onto a rolling platform and place into a heated paint booth to volatilize moisture entrapped within joints of the bed. Prime the bed while warm. Cure the primer in accordance with the paint manufacturer's instructions. Check the primer surfaces inside and out. Sand out any imperfections. Verify mil thickness of the primer to specifications.

11. Caulk all seams and joints with the specified polymer. Allow the caulking to cure in the paint booth. Proceed with the final finish paint application. Verify finish quality. Allow finish to cure. Finish may be accelerated with ultra violet lamps according to manufacturer's instruction.

12. Install interior shelving and clips in hidden storage enclosures. Install gas lift shocks, locking latches, strikes, cable lock assemblies. Surround the annular door openings with the specified gasket materials. Install drain check valves in the fore and aft storage compartments. Verify form and fit. Door should close and secure without slamming shut.

13. Reinstall the truck bed on the truck chassis. Truck should be on a level slab at the time of reinstallation of the bed, verify tire wear and pressure prior to final level check.

14. Shim to level as required. Do not install excess shim stock materials. Bolt down the bed to the manufacturer's specified bolt torque settings.

15. Reinstall the spare tire, if required. Reinstall the tail light assemblies and reflectors and connect the wiring harnesses. Verify tail light, signal light and brake light operations. Verify the fuel tank filler neck and cap is securely attached to the side panel. Check gasket around fuel filler tube.

Original Equipment Manufacturing (OEM) Assembly Sequence

1. The manufacturing production and assembly of the hidden storage system begins in the forming and molding fabrication section. This is accomplished by means of stamp forming sheet metal into the pickup truck bed components in hydraulic presses with accompanying dies, breaks and shears.

2. Manufacture of the hidden storage system components may also be accomplished by means utilizing SMC (Sheet Molded Compounds) composite materials in molded or sheets goods.

3. Roll or flat stock forming sheet metal (with a thin cost of forming oil) is fed into a sizing shear die or forming die, if the material is pre-cut The process continues through subsequent sizing and forming die which progressively shape the bed panels for the front end, floor, wheelhouse, exterior and interior door and tailgate. Reinforcement, bulkhead, clips and shelving components are fabricated similarly by standard of the industry techniques. Metal structural components in the bed are not substituted with SMC material.

4. All metal components or SMC fabricated components are placed into an inventory system for final assembly. This manufacturing assembly procedure utilizes a JIT (just-in-time) parts system.

5. The final assembly of the fabricated and vendor outsourced components begin with feeding parts into a computer automated main assembly line conveyor system by means of a married computer automated spur conveyor system. Parts are fed upon demand controlled by a computer sequencer operation.

6. The basic bed structural components are conveyed to the automatic pin-fit jib robotic welding platform system which positions and locks the bed components of floor panel, front end panel, inside storage box panels, wheelhouse and tailgate bulkhead panel into a precise tolerance weld-up by means of utilizing state of the art robotic welding machines and associated platform positioning equipment.

7. The robotic welding machines retract and the jig system reverses lockup closure of the welded bed components allowing the chain conveyor to lift the bed into the next assembly sequence of bolting the pre-assembled tailgate door and hidden storage exterior door panel into the assembly held in position by means of special wire restraints to prop open the doors and tailgate for priming and final painting systems application.

8. The assembled bed proceeds into a highly illuminated booth to allow visual Q&A (quality and assurance) inspection for dolly, grinding and sand-out correction of any minor surface imperfections prior to primer application. Special brazing is also accomplished at this stage in stress areas at the upper portion of the inside corners of the tailgate bulkhead.

9. After exiting the inspection and surface correction station, the bed progresses through a deionized water spray bed paint surface conditioning booth and then continues to be conveyed into the immersion primer bath. The welded bed is primed by means of an immersion bath system. The bed enters and leaves the primer bath at inclined positions to allow entrapped primer material to quickly drain from the bed and storage compartment areas. Strategic drain holes are provided to allow excess primer material to drain from entrapped areas.

10. Primer curing is accomplished by means of conveying the bed through a heated tunnel drying booth until the temperature reaches approximately 345–350 degrees Fahrenheit for the recommended time specified by the paint manufacturer as sufficient to cure the metal protection primer coat. The bed then progresses along the conveyor allowing cooling of the bed. The bed continues to progress into a second inspection station whereby the bed is highly illuminated by means of a lighting system along the walls and ceiling soffit areas allowing visual inspection for primer coat imperfections.

11. The next station is used to accomplish manual surface sanding of any surface defect, and hand spray touch up of the areas requiring correction of any minor aberrations found in the paint film surface. Rapid paint curing of touch up areas is accelerated by utilizing an ultra violet lamp which travels with the conveyed bed for approximately 8 minutes.

12. Caulking is then strategically applied over bed fabrication seams by means of a hand held caulking gun with controlled pressure fed in a precisely controlled manner, forming a smooth caulk bead for aesthetic reasons and preventing moisture from entering the bed joints to inhibit hidden rust formation.

13. After the drying booth and visual inspection sequence, the bed continues into the final color paint booth. Paint color is pre-selected and is automatically applied by means of a robotic turbo head paint applicator onto the bed. The bed is negatively charged and the paint is positively charged. The paint precipitates onto the bed components electrostatically.

14. Paint mil thickness application, if obtained by means of controlling the application term, fluid flow and speed of the robot. Inside of corners will require hand gun touch up paint application to obtain the specified mil thickness where discreet electrostatic precipitation deficiencies occur due to the physics inherent to automatic electrostatic paint application.

15. The bed paint drying and cure will then be processed by means of a tunnel oven which will allow temperature and time cure of the final paint coating. Heat is increased to a maximum of 345 degrees F. and slowly cooled as it progresses to the final visual inspection station.

16. The final visual quality assurance inspection is undertaken by the means of a high illumination booth. Units with surfacial imperfections in the paint are removed from the line and individually repaired manually with standard paint rub out techniques with re-coat as required. Re-coat paint cure is accelerated with an ultra violet paint lamp applied to the re-coat surface for approximately 8–10 minutes.

17. The bed continues along the assembly line conveyor through final assembly component stages whereby the tailgate and hidden storage door hardware, including strikers, latches, locks, handles, cables, hidden latch assemblies, perimeter and specialty door gaskets, storage compartment drain check valving, siring harnesses, tail light assemblies, shelving, shelving clips, shelving liners and manufacturing decals are manually installed or applied.

18. Final quality assurance inspection for form, fit and function is performed as the bed exits the assembly line. Special PVC plastic film is placed over bed areas subject to transport damage, and gas hatch covers to prevent opening by wind pressure.

19. The finished bed is lifted by means of a forklift and placed into a special rack designed for truck inter-model and low boy trailer shipment to stocking distributors.

FIGS. 7–10 schematically illustrate modifications of the fender/side panels of the hidden storage system illustrated in FIGS. 1–4. It is to be understood that in actual practice the embodiments of FIGS. 7–10 would be configured as described above to match the external contour of the fender/side panels, and the storage boxes would be positioned within the bed as described above. Also, it is to be understood that a storage box could extend only along a section of the side panel which is hinged, and not the entire length of the side panel.

Figure 7:
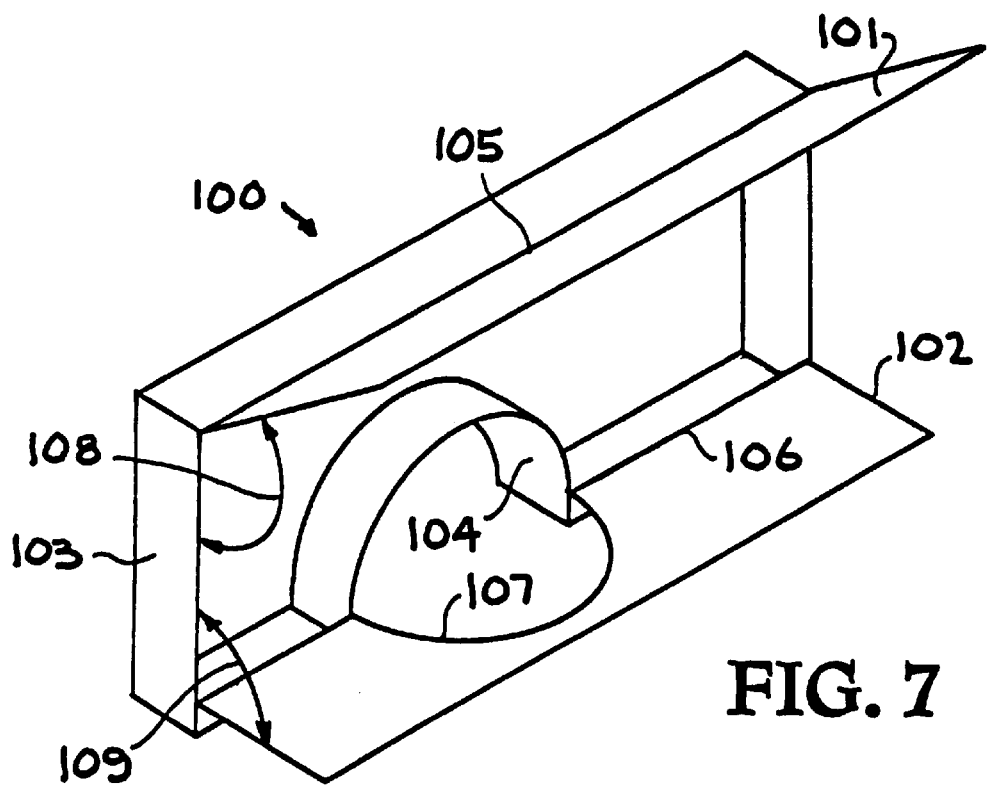
FIGS. 7–10 schematically illustrate various modifications of side panel and storage box arrangements of the hidden storage system of FIGS. 1–4.

FIG. 7 illustrates a split side panel arrangement generally indicated at 100 wherein a pair of longitudinal extending panel sections forming an upper panel section 101 and a lower panel section 102 are hinged to a storage box 103 formed over a wheel well 104 as indicated along horizontal lines 105 and 108, with the lower panel section 102 being configured as indicated at 107 to cooperate with the wheel well 104. As indicated by arrows 108 and 109, the upper panel section 101 and the lower panel section 102 are hinged whereby section 101 is raised and section 102 is lowered. While not shown, the upper panel sections would be provided with restraining struts, etc. This arrangement provides at least three advantages: 1) the lower panel section 102 may be utilized as a work shelf or bench, and 2) in case of strong winds, for example, the upper panel section is smaller and thus easier raised and lowered; and 3) only the upper or lower panel section may be utilized without having to raise the entire side panel. Also, the upper and lower panel sections would be provided with a latch and lock mechanism.

Figure 8:
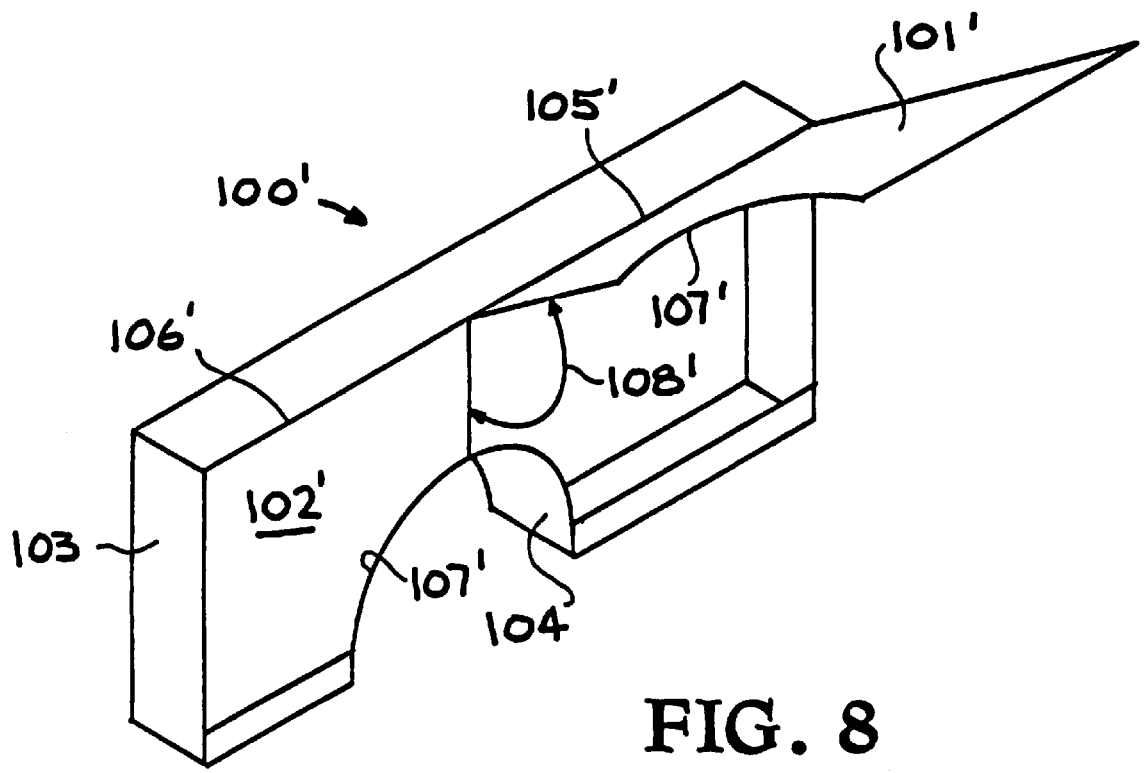

The FIG. 8 embodiment differs from the FIG. 7 embodiment in the configuration of the side panel sections, and corresponding reference numerals illustrate corresponding components. In this embodiment only one or both side panels can be hinged. In FIG. 8, the split side panel arrangement generally indicated at 100' includes a pair of split side panel sections 101' and 102' which are hinged along horizontal lines 105' and 106' at the upper end thereof. The panel sections are configured to conform with the contour of a conventional side panel pickup. Side panel section 101' is shown in the raised or open position as indicated by arrow 108', while side panel section 102' is in the lowered or closed position. In this embodiment, only side panel section 101' may be hinged with the storage box 103' only extending the length of section 101'. In this embodiment, each of the side panel sections 101' and 102' include a section 107' configured to cooperate with the wheel well 104' of storage box 103'. While the side panels 101' and 102' are hinged to swing or open upwardly, they could be hinged along the lower ends, as side panel section 102 of FIG. 7, whereby they could be lowered when opened, or hinged such that one section opens upwardly and one section opens downwardly. Also, only side panel section 101', for example, may be hinged. The advantages of the FIG. 8 embodiment is in the use of the storage area in front of the wheel well or in back of the wheel well, or both. Also, with only one section of the side panel open, there is less resistance to winds and can be easily opened and closed compared to the full side panel. While not shown, the side panel section 101', and if hinged the side panel section 102', would be provided with support or retention struts if opened upwardly or with retaining means, similar to that of a conventional tailgate, if hinged to open downwardly. A latch and lock arrangement, while not shown, would be provided for the hinged panel section(s). Also, the side panel sections are configured to conform with the contour of the desired side panel bed.

Figure 9:
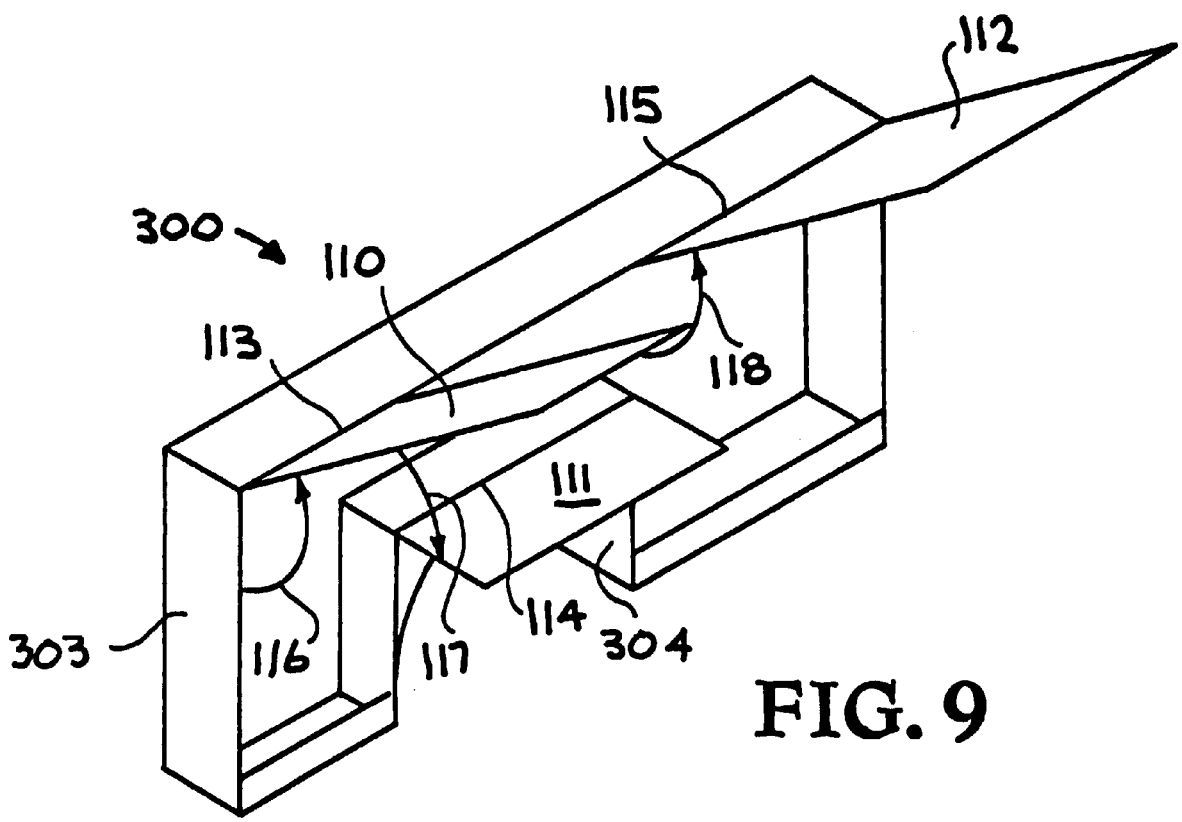

FIG. 9 illustrates another arrangement involving three movable side panel sections and components corresponding to those of FIG. 7, and are given corresponding reference numerals. As shown, the three-way split side panel arrangement generally indicated at 100' comprises a storage box 303 built over a wheel well 304, and provided with three (3)

hinged side panel sections 110, 111 and 112 which are hinged along horizontal lines indicated at 113, 114 and 115 respectively. As indicated by arrows 116, 117 and 118, side panel sections 110 and 112 open upwardly while side panel section 111 opens downwardly. However, side panel section 111 may be hinged to open upwardly, and all three sections may be hinged on a common hinge. In addition, sections 110 and Ill may be hinged at a lower end so as to open downwardly. In this embodiment, the center side panel section 111 may be used as a work table, and any of the storage box sections above, in front of, or behind the wheel well may be utilized. If desired, only one or two of the three sections may be hinged end provided with a storage box therebehind, whereby storage would only be in one or two sections adjacent the wheel well.

Figure 10:
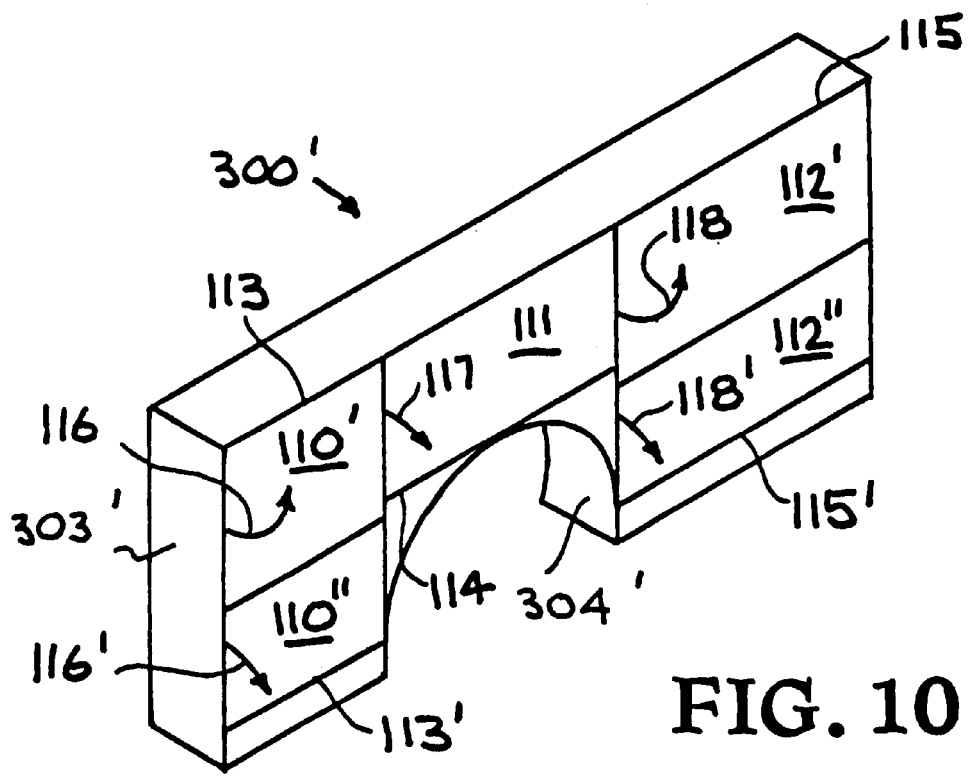

FIG. 10 illustrates a modification of the FIG. 9 side panel arrangement indicated generally at 300', and differs in utilizing five (5) side panel sections instead of three, with two of the sections being split. Corresponding reference numbers are given for corresponding components. The difference between FIG. 9 and FIG. 10 is that the two end sections of the side panel are split as indicated at 110'–110" and 112'–112', with panel sections 110" and 112' opening upward and panel sections 110" and 112" opening downward as indicated by arrows 116–116' and 118–118', with lower panel sections 110" and 112" being hinged along lines 113' and 115'. As in the FIG. 9 arrangement, the central side panel section 111 can be hinged to open upwardly instead of downwardly as shown. In this embodiment any or all of panel sections 110", 111 and 112" can be utilized as a work table or bench. Also, by the arrangement of FIG. 10, there is access to various sections of the storage box 303 without the need to expose the entire interior of the storage box. As described above, the individual side panel sections are each provided with a latch/lock system and, if desired, the latch/lock system may be constructed to release individual or all of the side panel sections, either mechanically or electrically, as described below.

The side panel section arrangements of FIGS. 7–10 enable, if desired, the length and location of the storage box located behind the hinged sections. For example, with the FIG. 8 arrangement, the storage box need only extend half the length of the bed, providing side panel section 102' was not hinged. Also, with the panel section arrangement of FIG. 7, the storage box may need only extend along the bed so as to be located above the level of the wheel well, provided the lower side panel section 102 is not hinged. As readily seen from the arrangements of FIGS. 9 and 10, certain side panel sections need not be hinged and the storage box therebehind may be constructed only to extend the length or depth of the desired hinged side panel sections. Regardless of the side panel section arrangement a user may desire, the hinged side panels must conform to the contour of the overall side panel configuration. It is recognized that the external appearance of the overall side panels of the bed will show vertical or horizontal cuts defining the various side panel sections involved when sections of the side panels are hinged as illustrated in FIGS. 7–10.

Figure 11:
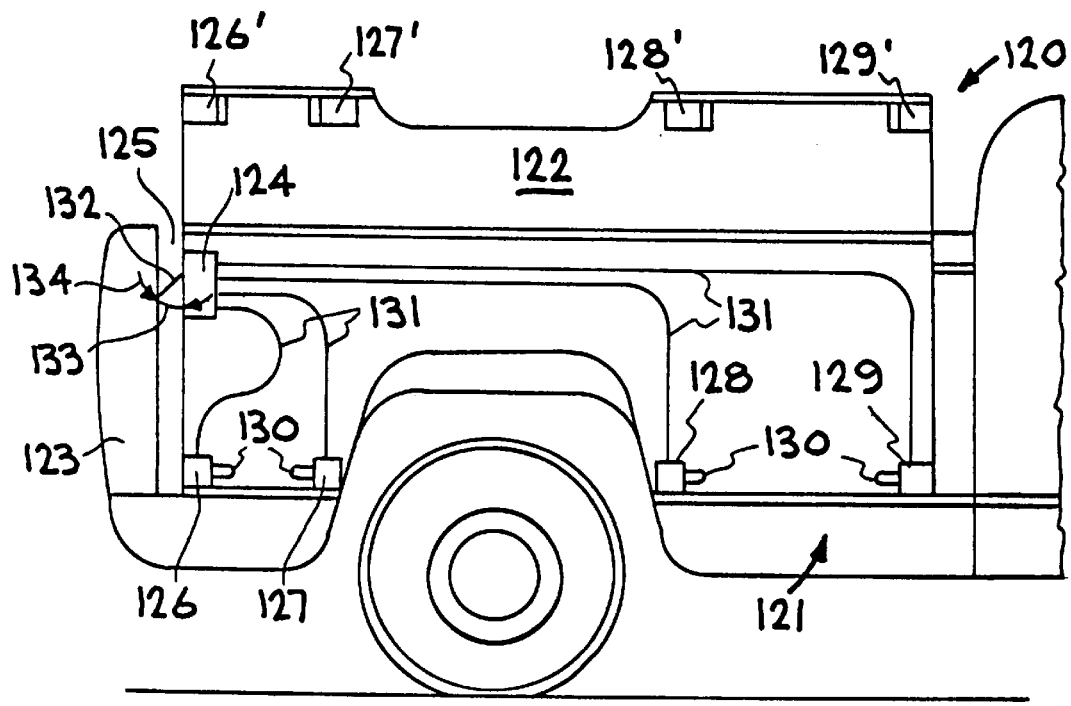
FIGS. 11 and 12 schematically illustrate mechanical latch/lock arrangements for the hinged side panels.
Figure 12:
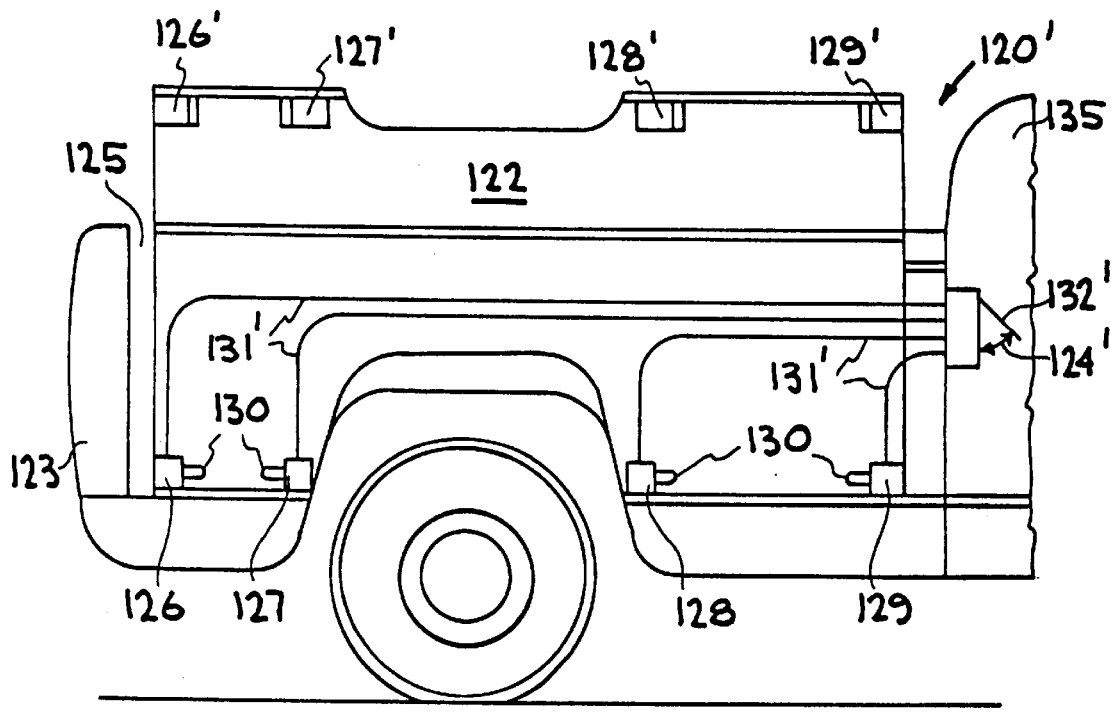

FIGS. 11 and 12 schematically illustrate embodiments of a mechanical type latch/lock mechanism, the difference between the embodiments being the location of the control: forward of the tail gate in FIG. 11, and in the vehicle cab in FIG. 12. In each of the embodiments of FIGS. 11 and 12, the latch mechanisms are cable actuated. As shown, a vehicle indicated at 120 having a bed 121 containing a hidden storage system which includes a storage box as above described, and which includes at least one hinged side panel 122, and provided with a tail gate 123, includes a lock release mechanism generally indicated at 124, having a keyed lock, not shown, and located at the rear of the storage/utility system and spaced as indicated at 125 from the tail gate 123. By this arrangement, the lock release mechanism 124 can be actuated without lowering the tail gate 123. The latch mechanism constructed of cooperating components are indicated at 126–126', 127–127', 128–128', and 129–129', with components 126, 127, 128 and 129 secured to the bed 121 or storage box within the enclosed area, while cooperating components 126', 127', 128' and 129' are secured to the inner and lower edge of the hinged side panel 122, such that when the side panel 122 is lowered the components of the latch mechanism interconnect. The components 126–129 each include a movable release member 130, which is actuated by a cable 131 connecting the lock release mechanism 124 via a lever 132 of the lock mechanism 124. Thus, upon movement outwardly of lever 132 as indicated by arrow 133, the cable 131 activates the movable release member 10, where latch components 126'–129' are released from components 126–129, and the hinged side panel 122 can be raised as illustrated. To re-secure the side panel 122 when lowered, the lever 132 of lock release mechanism 124 is moved inwardly as indicated by arrow 134 whereby the activation cables 131 and release member 130 enable latch mechanism components 126–129 and 126'–129' to be reengaged for retaining the side panel 122 in a secured closed condition. Various types of mechanical lock/latch mechanisms are commercially available and thus a detailed description of a specific embodiment is deemed unnecessary. However, the lock/latch mechanism should be constructed to prevent the side panel 122 from being easily pried open. Some known lock/latch mechanism require a 1500 pound pry to open same.

The FIG. 12 embodiment is similar to that of FIG. 11 except that the lock mechanism 124' is located in a cab 135 of the vehicle 120'. The lock release mechanism 124' can be located, for example, in the glove box of the cab. This arrangement provides additional security of the lock mechanism while enabling ready access thereto by the operator of the vehicle 120'. With the cab located lock/latch arrangement of FIG. 12, the storage box of the storage system may be extended to the tail gate 123, thereby eliminating the space 125 between the tail gate and the storage box. With the rear mounted lock mechanism as shown in FIG. 11, should the storage box be extended to the tailgate 123, the tailgate must be opened to enable access to the lock mechanism 124.

Figure 13:
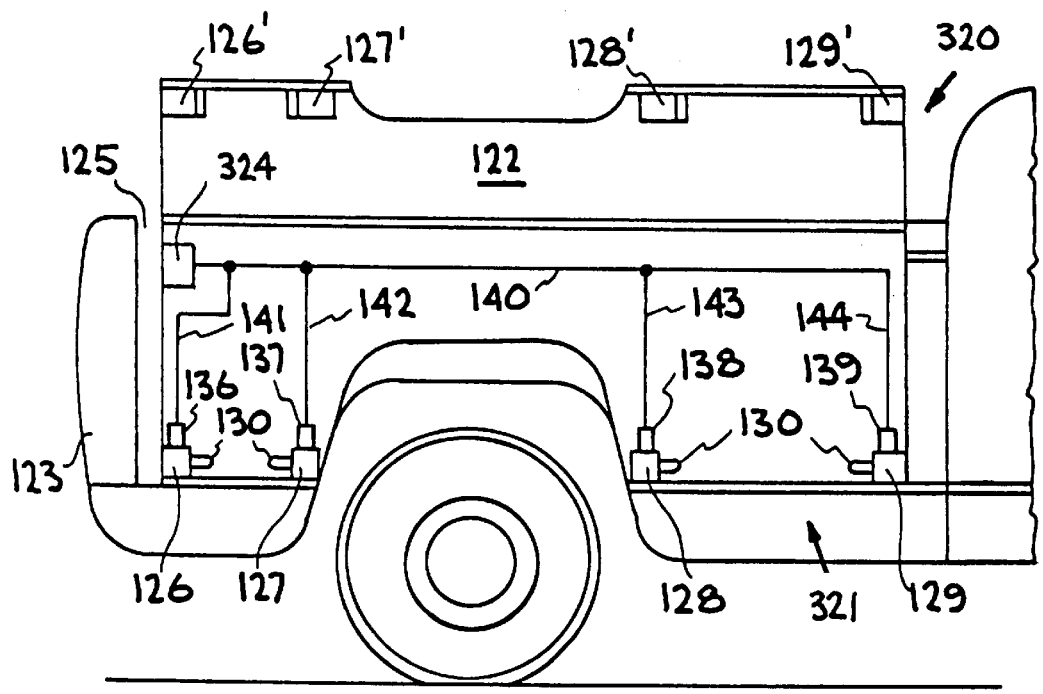
FIGS. 13 and 14 schematically illustrate electrical latch/lock arrangements for the hinged side panels.
Figure 14:
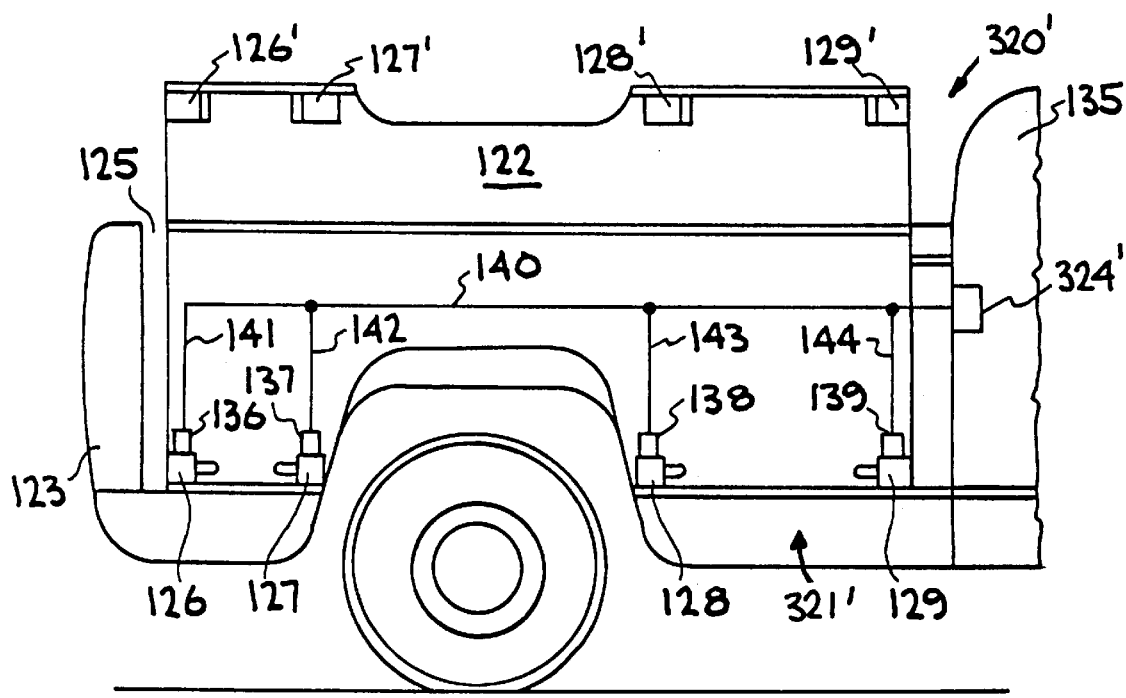

FIGS. 13 and 14 illustrate an electrically activated lock/latch mechanism, and is constructed similar to that of FIGS. 11–12, except that electric solenoids and electric leads replace the activation cables of FIGS. 11–12 and the lock release mechanism requires only a push button or key to actuate the latch mechanism via the solenoids. Also, the lock mechanism may be remotely controlled, such as by well known vehicle security key/lock systems. As shown in FIG. 13, the lock release mechanism 324' is located at the rear of the storage box and spaced from the tailgate 123 as indicated at 125. Cooperating latch mechanisms 126–126', 127–127', 128–128' and 129–129' are mounted on bed 321 and side panel 122 as described above in FIG. 11. Each of latch mechanism components 126, 127, 128 and 129 are provided with a solenoid 136, 137, 138 and 139 which are connected to lock release mechanism 324 via electrical leads 140, 141, 142, 143 and 144. To release the latch mechanism to enable opening of the side panel 122, the lock release mechanism 324 is activated, such as by a push button, key, or combination, as known in the art, which activates solenoids 136–139 thereby moving movable members 130 to allow latch components 126'–129' to be released from latch components 126–129, allowing side panel 122 to be opened. Since solenoid activated lock/latch mechanisms are well known in the automotive art, further description is deemed unnecessary.

FIG. 14 illustrates an embodiment of the electrical lock/latch mechanism as in FIG. 13 but with the lock release mechanism 324' located in cab 135, as in the FIG. 12 embodiment. As in the FIG. 12 embodiment, the lock release mechanism 324' can be located in the glove box, behind the seat, or elsewhere in the cab.

While the FIGS. 11–14 embodiments have illustrated the use of four (4) latch mechanisms, that number may be less for a single hinged side panel. Where the hinged side panel is composed of side panel sections, as in FIGS. 7–10, each hinged section should include one or more latch mechanisms, either mechanical or electrical. Also, where the side panel sections are hinged to open downwardly, the location of the cooperating latch mechanism components may be different and, for example, such may be secured to the sides of the hinged side panel sections and to a cooperating location on the storage box.

Figure 15:
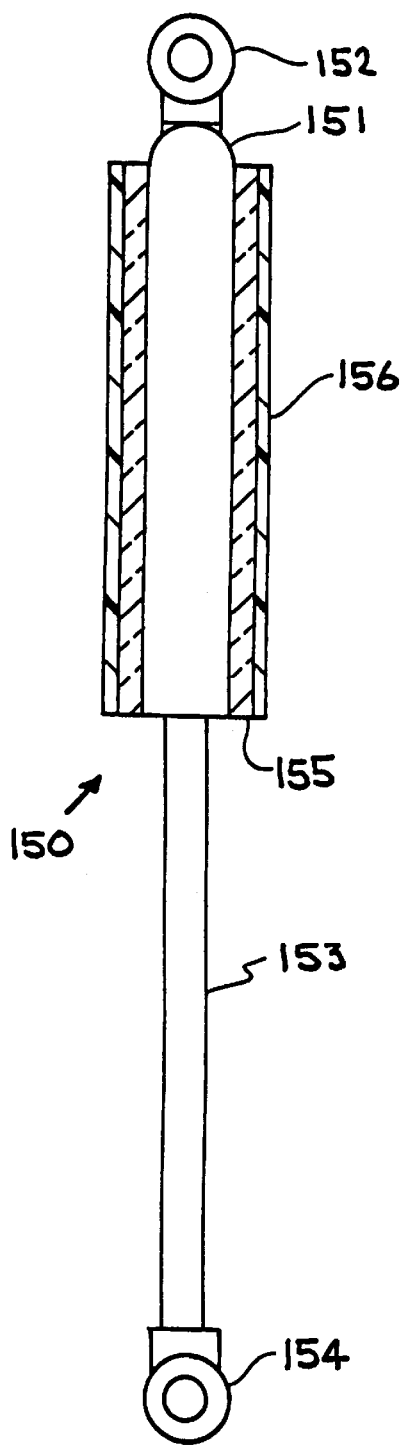
FIGS. 15 and 16 illustrate embodiments of struts for the hinged side panels with FIG. 15 having an insulated liner, while FIG. 16 includes a heater unit.
Figure 16:
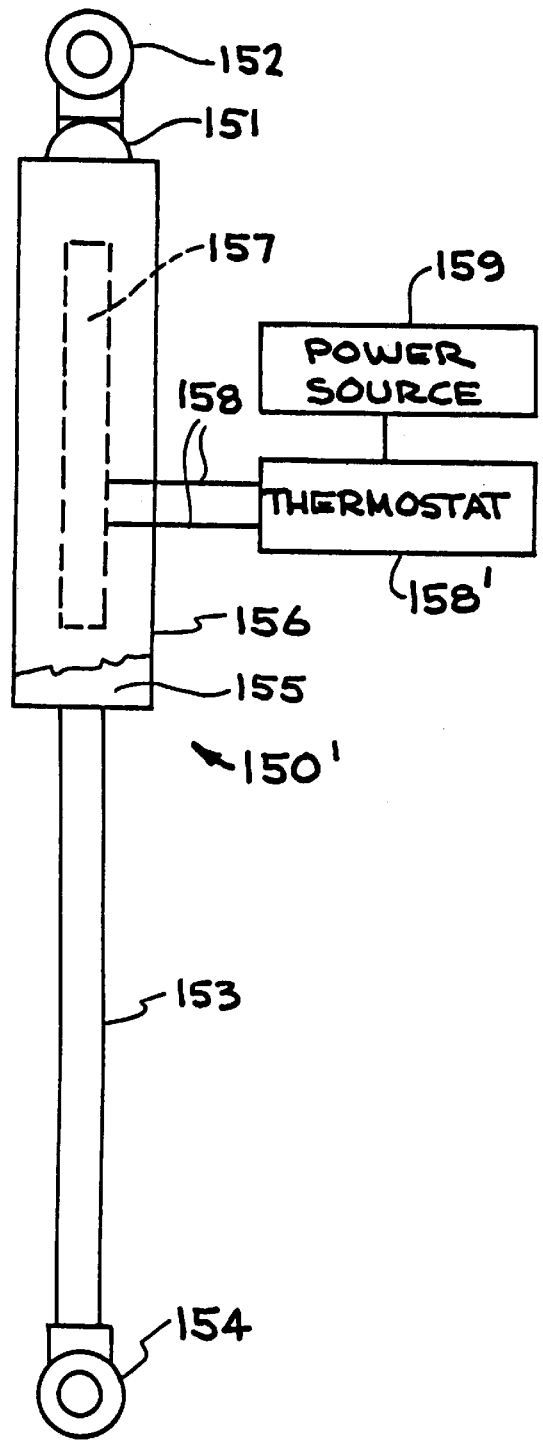

As pointed out above, the upwardly opening side panels are provided with means for retaining same in open position, such as by a conventional strut assemblies, widely used in the automotive field for retaining open rear windows or doors. However, hinges are also commercially available which are constructed to retain a door or window open, and thus could be utilized in the hinged side panels. The use of strut assemblies is generally preferred, but struts have disadvantages when operating in extreme temperature conditions, either hot or cold. This problem is resolved by the strut assemblies illustrated in FIGS. 15 and 16, wherein insulation and/or heating therefor is provided. FIG. 15 illustrates a conventional strut assembly with insulation about the body member, while FIG. 16 additionally illustrates an electrical heating strip for a conventional strut. However, the heating strip of FIG. 16 can be incorporated into the insulated strut assembly of FIG. 15. As shown in FIGS. 15 and 16, the strut indicated at 150 comprises a body member 151 having a connector member 152 at one end, and a plunger member or rod 153 having a connector member 154 reciprocally mounted in body member 151, and which is sealed in member 151 as known in the art. The body member 151/rod 153 may be provided with a conventional fluid or air arrangement which allows the rod 153 to be moved in or retained in the body member 151. In FIG. 15, the body member 151 is provided with a layer 155 of insulation material and a protective layer or sleeve 156 about the insulation layer. However, depending on the composition of the insulation layer 155, the protective sleeve or layer 156 may not be needed. In FIG. 16, which is constructed as in FIG. 15, the body member 151 is additionally provided with one or more electrical heating strips 157 (only one shown), which would be electrically connected via electrical leads 158 via a thermostat 158' to the power supply 159 of the vehicle on which the strut is utilized. The electrical heating strip(s) 157 is positioned between the body member 151 and the insulation layer 155, whereby a heated/insulated strut is provided to withstand either extremely high or extremely low temperatures. However, the body member 151 may be provided only with one or more heating strips, if desired.

The hidden storage system, as illustrated in FIGS. 1–4, for example, may be provided with support/safety mechanisms, as illustrated in FIGS. 17–20, which comprise a pair of collapsible beams. Upon impact from a side of the storage/utility system, the beams collapse rather than bending, thereby preventing rupture or puncture of a fuel tank, typically located beneath the bed of a pickup truck.

Figure 17:
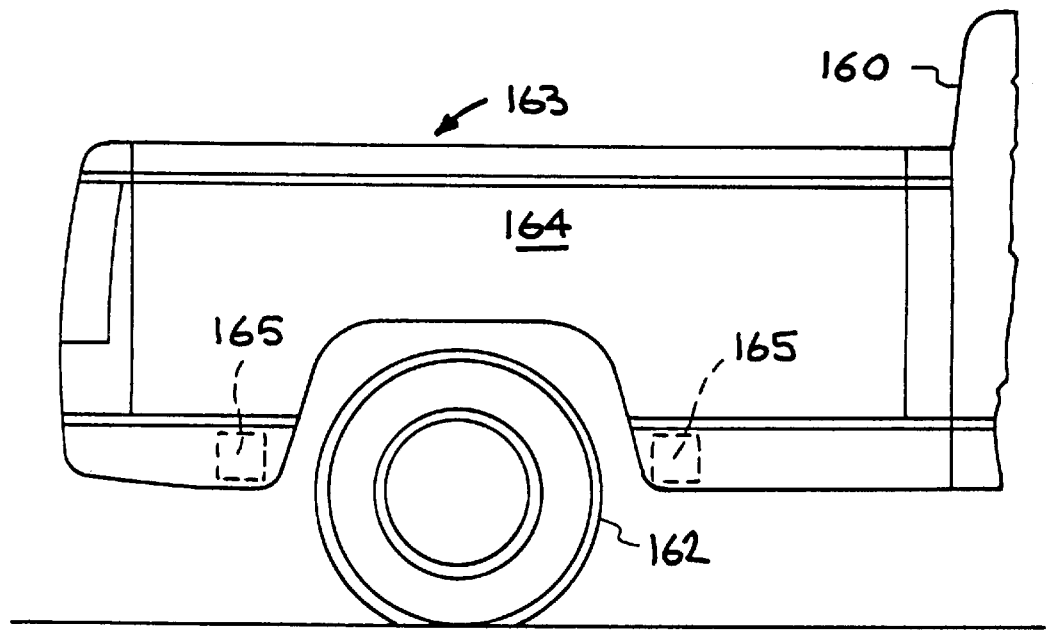
FIGS. 17–20 illustrate an embodiment of a collapsible support beam for providing support for the bed and providing protection for the fuel tank typically located under the bed with FIG. 20 being taken along the 20—20 of FIG. 19.
Figure 18:
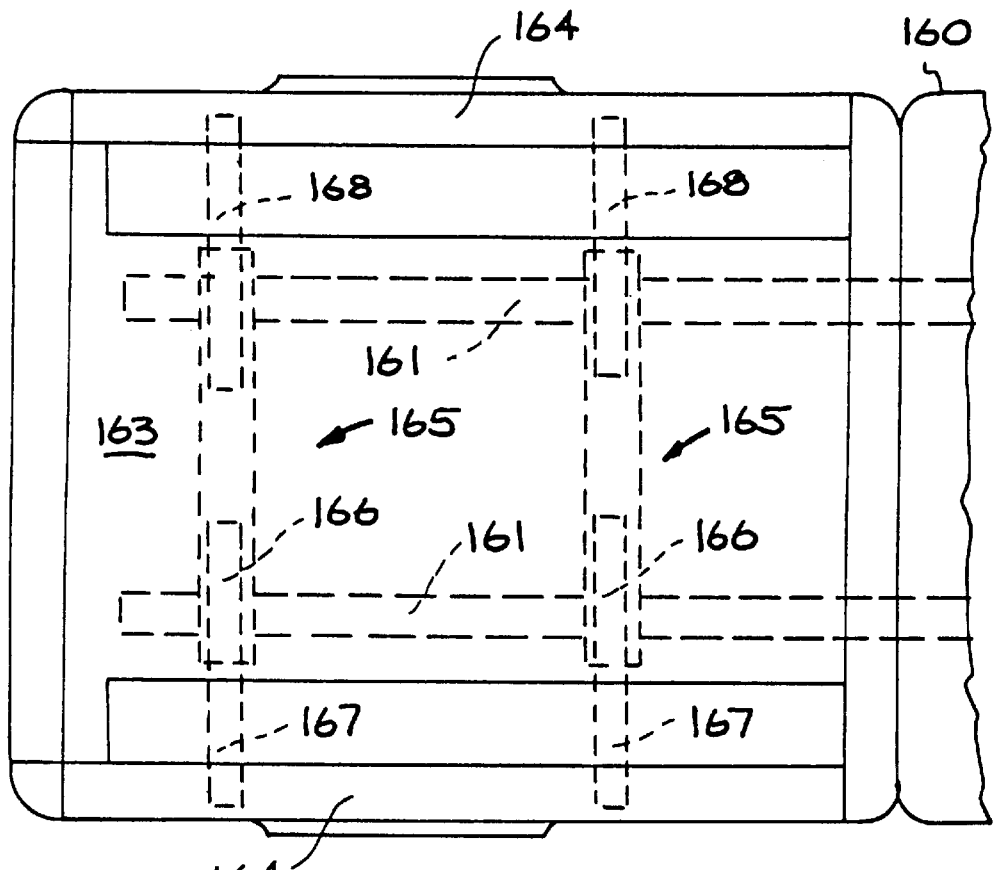
Figure 19:
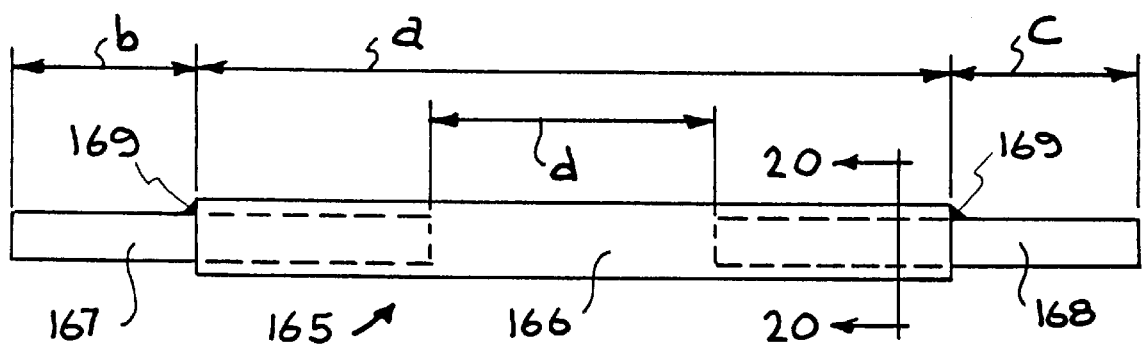
Figure 20:
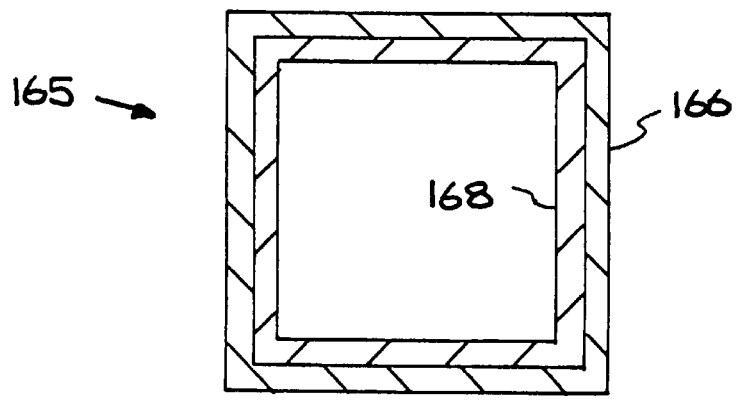

As seen in FIGS. 17 and 18, a vehicle 160, such as a pickup truck, having frame members 161, wheels 162 (only one shown) mounted on an axle, not shown, is provided with a hidden storage bed 163 having side panels/fenders 164, such as illustrated in FIGS. 1–4. A pair of collapsible support beams 165 are mounted across the frame members 161 and extend outwardly so as to terminate inside the side panels/fenders 164. As seen in FIG. 19, each of the collapsible support beams 165 is composed of a central section 166 and end sections 167 and 168 that are constructed to extend into central section 166, a cross-section of the central section 106 and end section 168 is illustrated in FIG. 20, as taken along the line 20—20 of FIG. 19. Beams 165 may also be rectangular, circular, etc. in configuration. As seen in FIG. 19, central section 166 of beam 165 has a length, a, while end sections 167 and 168 extend from central section 166 by a length, b and c, respectively, with the inner ends of end sections 167 and 168 being separated by a distance, d. The length of a, b, c and d is determined by the width of bed 163. The end sections 167 and 168 may be spot welded, for example, at a desired point to central section 166.

The collapsible support beams 165 are constructed such that end sections 167 and/or 168 will collapse or slide into central section 166 should either of the side panels/fenders 164 be impacted. By constructing the beams 165 to be collapsible, impact causes same to collapse rather than bend such that a fuel tank mounted under bed 163 is not ruptured or punctured due to bending action of the support beams 165. Inasmuch as the bottom or floor of the bed 163 is mounted above the support beams 165, impact from the side will result in the floor bending upward, not downward due to the support beams, thus also preventing rupturing or puncturing of a fuel tank by the bed floor. Thus, in addition to supplying support for the hidden storage bed 163, the support beams 165 provide a needed safety feature by protecting the fuel tank from impact.

The hidden storage system is constructed such that a variety of storage shelves and/or storage compartments may be positioned in the storage boxes on either side of the bed. The storage boxes are provided with means by which shelves or compartments may be installed to fit a user's needs. The storage boxes may include areas of sufficient length and height for the storage of skis, ski poles, ski boots, and ski clothing, or for the storage of golf club bags and associated equipment or clothing, as well as for various tools, parts, etc. Also, the storage boxes may be designed to include areas for the storage of shopping purchases whereby such are secured from view—a truck with a trunk.

Figure 21:
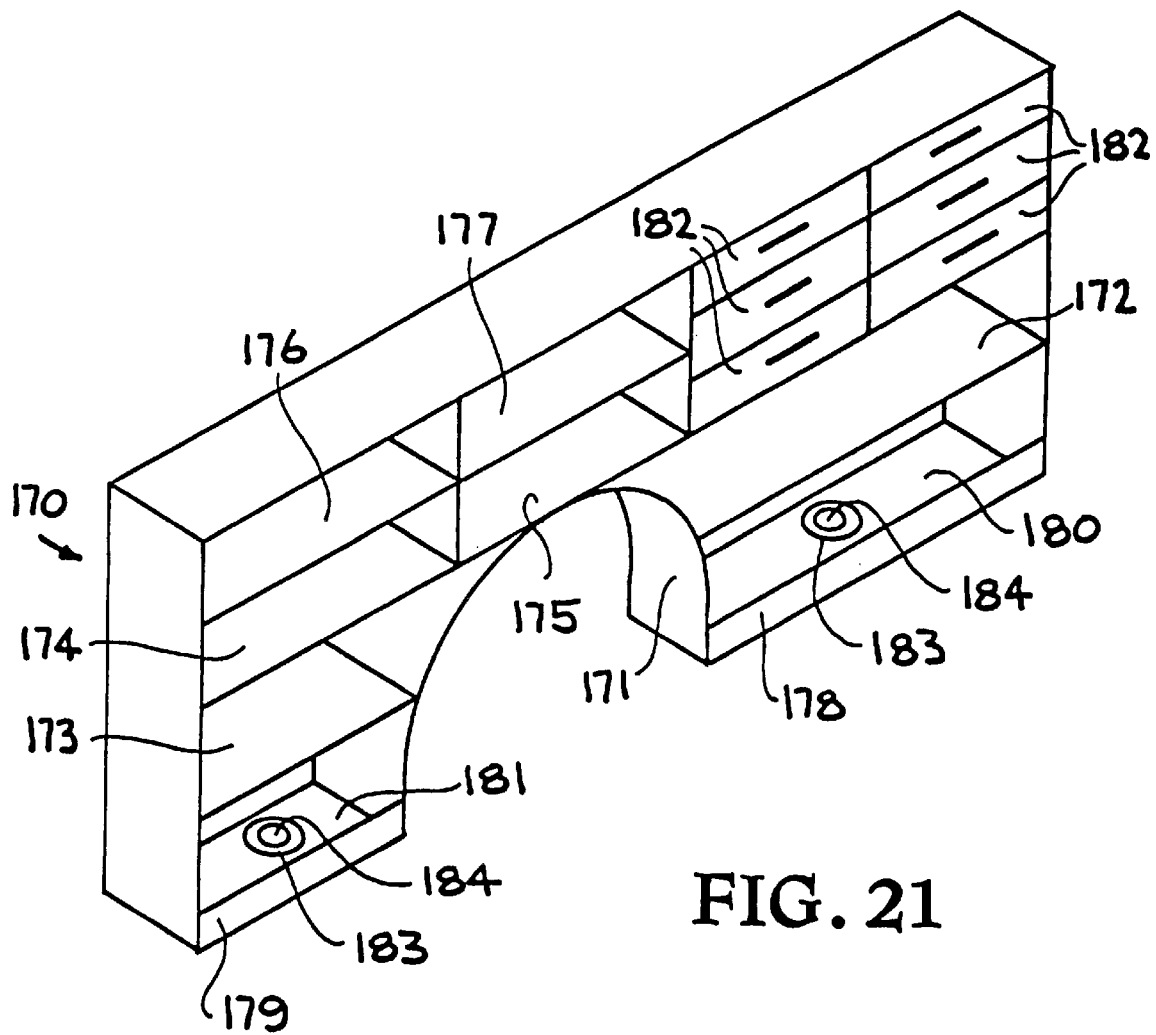
FIG. 21 schematically illustrates a shelving/storage arrangement for the storage box of the FIGS. 1–4 storage bed.

FIG. 21 schematically illustrates a shelf/storage compartment arrangement for tools, parts, etc. The shelves and storage compartments may be mounted so as to be movable (slideable) or adjustable. As shown in FIG. 21, a storage box such as illustrated at 22–23 in FIG. 2, and here generally indicated at 170, and which includes a wheel well section 171, is provided with different size and/or length shelves 172, 173, 174, 175, 176 and 177. As also illustrated in FIGS. 7–10, the storage box 170 is provided with upwardly extending lips or members 178 and 179 which form open boxes or compartments 180 and 181. However, the storage box 170 may be constructed to provide a flat surface at the bottom by elimination of the upwardly extending members 178 and 179, as shown in FIG. 3. The storage box 170 of FIG. 21 additionally includes six compartments or drawers, indicated at 182, for small parts, etc. Each of the compartments 180 and 181 is provided with an opening 183 containing a drain/air relief valve assembly 184.

Figure 22:
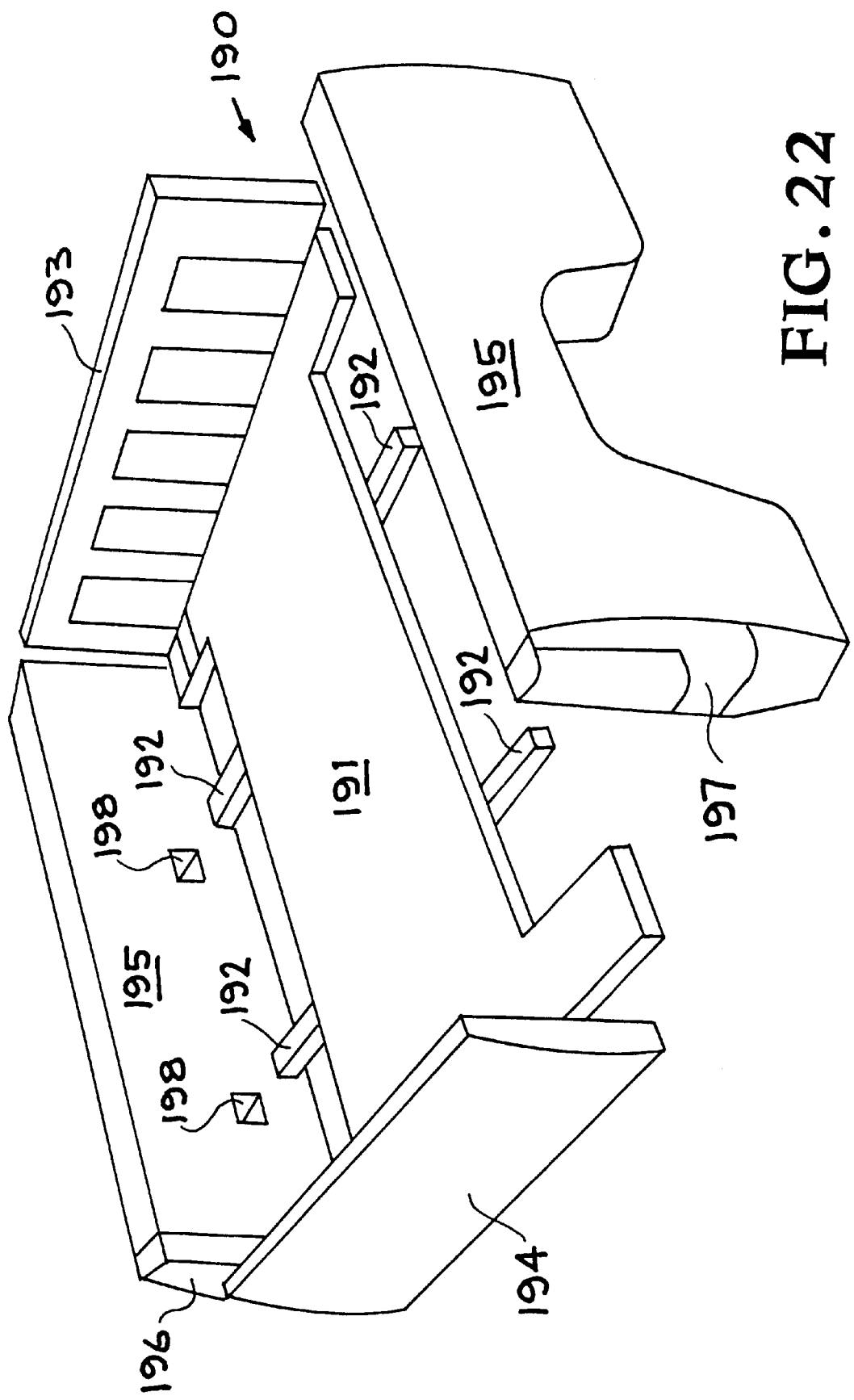
FIGS. 22 and 23 illustrate a modular fabrication assembly with FIG. 23 including a shelving/storage arrangement utilizing adjustable and/or slideable shelving in the storage box of the bed.

FIG. 22 illustrates a modular assembly approach for the hidden storage bed similar to that of FIGS. 1–4 utilizing the collapsible support members or beams, as described above with respect to FIGS. 17–20. As shown schematically in FIG. 22, the bed generally indicated at 190 is basically composed of five modules or assemblies comprising a floor assembly 191 to which collapsible support beams 192 are mounted or connected, a bulkhead assembly 193, a tailgate assembly 194, and a pair of side panel assemblies 195 having connected thereto tail light assemblies 196 and 197, respectively. Side panel assemblies 195 are provided with openings 198 into which collapsible support beam 192 extends, as illustrated in FIG. 18. One of the side panel assemblies 195 is shown in greater detail in FIG. 23 wherein a side panel 199 thereof is illustrated in an open position and retained by a gas lift or strut 200 (only one shown) which may be constructed as shown in FIGS. 15 and 16.

Figure 23:
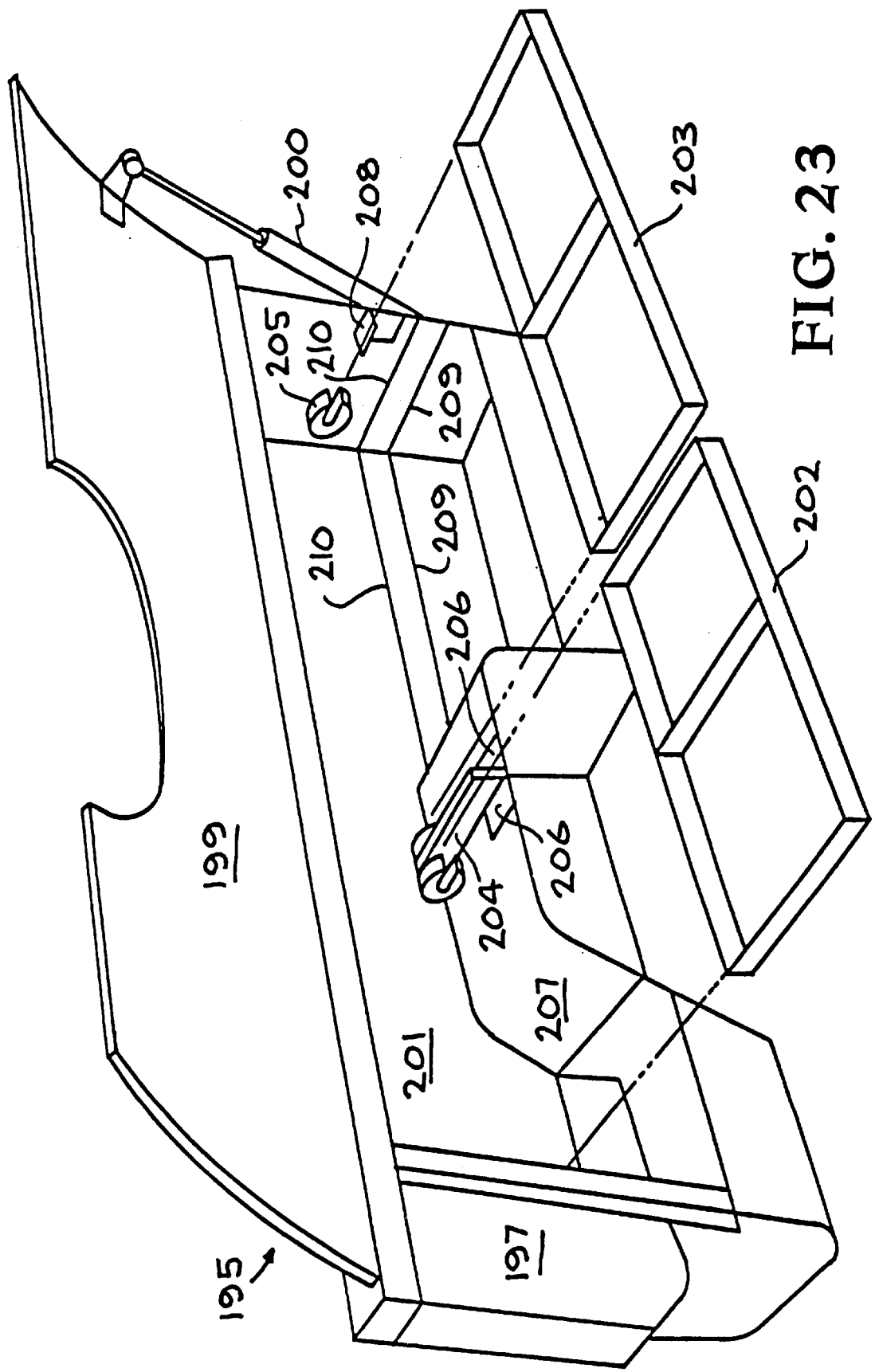

As seen in FIG. 23, the side panel assembly 195 additionally includes a storage box 201 into which are slideably mounted shelves or box shelves 202 and 203, which are supported by a common support member 204 and a pair of end support members 205 (only one shown). The inner ends of slideable shelves 202 and 203 slide on members 206 secured to the wheel well 207, while the outer ends of shelves 202 and 203 slide on member 208 (only one shown) secured to ends of the storage box 201. The storage box 201 is additionally provided with shelf supports 209 and 210 on which a shelf, not shown, can be mounted whereby the height thereof can be adjusted for various uses. If desired, support members similar to member 205 can be located at 209 or 210 to enable the uses of additional sliding shelves.

Figure 24:
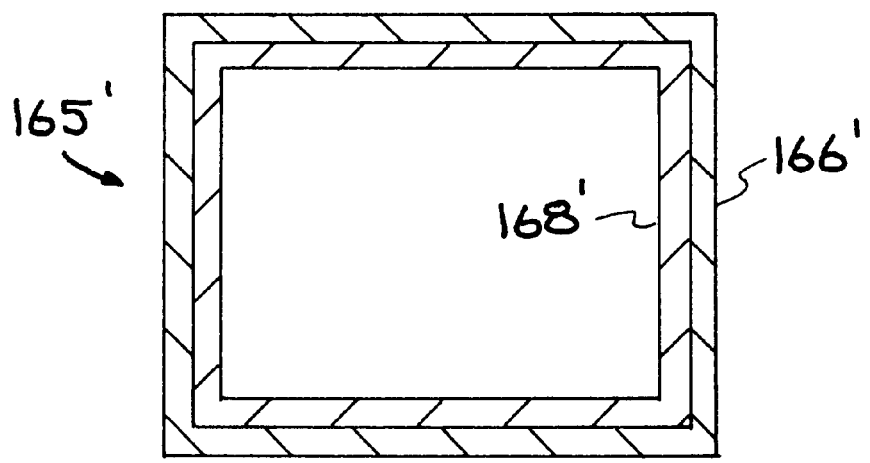
FIGS. 24 and 25 illustrate rectangular and circular cross-sections of the collapsible beam of FIG 19.

FIG. 24 illustrates a rectangular cross-section of an embodiment of the collapsible support beam of FIG. 19, generally indicated at 165', which includes a central member 166' and an end member 168'.

Figure 25:
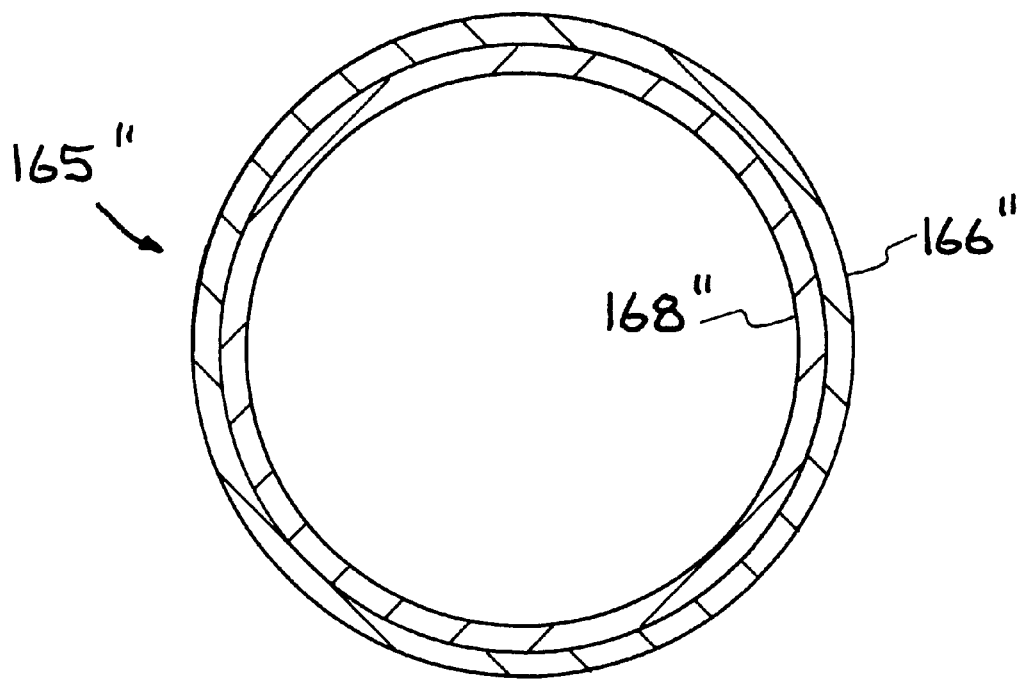

FIG. 25 illustrates a circular cross-section of an embodiment of the collapsible support beam of FIG. 19 and is generally indicated at 165", and includes a central member 166" and an end member 168".

It has thus been shown that the present invention provides a hidden storage arrangement that can be initially built into a pickup truck bed, or a conventional bed can be converted to include the storage arrangement without altering the external appearance of the bed and without a significant reduction in the carrying capacity of the bed. Thus a pickup truck, for example, now is provided with a trunk. While the invention has been described with respect to fleetside and stepside pickup beds, it can be readily incorporated into other types of pickup beds, trailers or full-sized truck beds having side panels without detracting from the appearance of the side panels, except for the vertical or horizontal cuts therein. Also, the hinged fender/side panel can be hinged along the entire length whereby the entire side panel, including the tail light section, can be raised and lowered to eliminate the vertical cut lines.

While specific embodiments of the storage system of the present invention have been described and illustrated, such are not intended to limit the invention to these embodiments. For certain applications only one storage box may be desired. Beds for pickups, trailers, and trucks are designed with differently constructed side panels and frame/undercarriage arrangements. For example, the bed 12 of FIG. 1 may extend downward to cover the frame or undercarriage 13, as shown, and thus the side panels 15 would include the extended area, or a cut, such as indicated at 34 in FIG. 3, can be made along a desired lower portion of the side panels to eliminate the need for raising the entire side panel when the extended area is part thereof.

Various side panel sections and associated storage box sections have been illustrated and/or described, as well as various shelving/compartment arrangements. It is understood that each storage system can be fabricated to include specific side panel opening arrangements (up or down), as well as the entire or only sections of the side panel(s) being hinged, depending on the user's need. The shelving/compartment arrangements can be made in accordance with a user's needs. The primary feature of the hidden storage bed is the fact that there is substantially no alteration of the external appearance of the side panels, the only alteration being lines formed by the cuts to provide the desired hinged panel or hinged panel sections.

While not shown, the hinged panel sections may be coated on the inner surfaces thereof with insulating and/or sound absorbing materials conventionally used in the automotive field. If desired, the interior of the storage boxes may be coated with similar materials. While not shown, the edges of the side panels adjacent the hinged panel sections may be provided with seals, similar to the seals utilized for automotive trunks, to prevent moisture or dust from entering the storage boxes when the hinged panel sections are closed. Since the lock and/or latch mechanism for the hinged side panel sections are not visible from an external view of the vehicle, they constitute a hidden latch mechanism. However, if desired, the lock, such as a key actuated mechanism, may be installed in a side panel section and thus would not be hidden from view.

Modifications and changes may become apparent to those skilled in the art, and it is intended that the invention be limited only by the scope of the appended claims.

What is claimed is:

1. In a vehicle bed, the improvement comprising:
at least one collapsible support member.

2. The vehicle bed of claim 1, wherein said at least one collapsible support member includes a central section and end sections, said end sections extending into opposite ends of said central section, said end sections being secured in said ends of said central section by means which breaks upon impact of said end sections for allowing said end sections allowing same to collapse into said central section.

3. The vehicle bed of claim 2, wherein said end sections extending into said central section are separated from each other by a distance "d".

4. The vehicle bed of claim 2, wherein an interior of said central section and an exterior of at least portions of said end sections which extend into said central section have a cooperating configuration.

5. The vehicle bed of claim 4, wherein said cooperating configuration includes square, rectangular, and circular configurations.

6. The vehicle led claim 2, wherein said end sections of said collapsible support member are constructed to extend into side panels of said vehicle bed.

7. The vehicle bed of claim 1, further including a floor section and a pair of side panel sections, said at least one collapsible support member being located beneath said floor section and having end sections which extend into said pair of side panel sections.

8. The vehicle bed of claim 1, including a plurality of the collapsible support members, each collapsible support member having a central section and opposite end sections wherein said end sections are collapsible into said central section.

9. The vehicle bed of claim 8, wherein said plurality of collapsible support members are located beneath a floor section of said vehicle bed.

10. The vehicle bed of claim 9, wherein said end sections of each of said collapsible support members extend into side panel sections of said vehicle bed.

11. A structural support system for a vehicle bed comprising:
   at least one collapsible support beam,
   said support beam including a central section and a pair of end sections constructed to collapse into said central section.

12. The structural support system of claim 11, wherein each of said pair of end sections has a portion extending into said central section, said portions of said end sections having ends spaced apart by a distance "d" said portions of said pair of end sections being secured in said central section by a connection.

13. The structural support system of claim 12 wherein said connection comprises at least one spot weld interconnecting said central section and one said end section.

14. The structural support system of claim 12, wherein said central section has an internal configuration, and said pair of end sections each have an external configuration corresponding to the internal configuration of said central section.

15. A collapsible structural support beam adapted to be mounted under a floor of a vehicle, said support beam consisting at;
   a longitudinally extending center section having an internal opening of a configuration selected from the group consisting of square, rectangular and circular configuration, and
   a pair of end sections having an external configuration on at least a portion thereof selected from the group consisting of square, rectangular and circular, and which cooperates with said internal opening configuration,
   said pair of end sections each having a portion thereof extending into said internal opening of said center section,
   each of said end sections including a connection to said center section,
   whereby an impact on an end of either of said end sections causes breakage of said connection allowing said impacted section to collapse into said center section.

16. The collapsible structural support beam of claim 15, wherein ends of said portions of said end sections extending into said center section are located at a spaced distance from one another.

* * * * *